(12) United States Patent
Nishibayashi et al.

(10) Patent No.: US 9,946,237 B2
(45) Date of Patent: Apr. 17, 2018

(54) ENERGY MANAGEMENT DEVICE, ENERGY MANAGEMENT SYSTEM, AND ENERGY MANAGEMENT METHOD

(71) Applicant: KABUSHIKI KAISHA TOSHIBA, Minato-ku (JP)

(72) Inventors: Yasuyuki Nishibayashi, Kawasaki (JP); Masahiro Yamazaki, Kokubunji (JP); Yoichi Morishima, Sumida (JP); Ikuya Aoyama, Yokohama (JP); Yusuke Doi, Yokohama (JP); Fumiaki Kanayama, Kawasaki (JP); Noritaka Deguchi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 448 days.

(21) Appl. No.: 14/631,044

(22) Filed: Feb. 25, 2015

(65) Prior Publication Data

US 2015/0241896 A1    Aug. 27, 2015

(30) Foreign Application Priority Data

Feb. 27, 2014    (JP) ................................ 2014-037388

(51) Int. Cl.
*G05B 15/02* (2006.01)
*G05F 1/66* (2006.01)
*G06Q 10/06* (2012.01)
*H02J 13/00* (2006.01)

(52) U.S. Cl.
CPC ............. *G05B 15/02* (2013.01); *G06Q 10/06* (2013.01); *H02J 13/0006* (2013.01); *Y02B 70/3216* (2013.01); *Y04S 20/221* (2013.01)

(58) Field of Classification Search
CPC ..... G05B 15/02; G06Q 10/06; H02J 13/0006; Y02B 79/3216; Y02B 70/3216; Y04S 20/221
USPC ......................................................... 700/286
See application file for complete search history.

(56) References Cited

U.S. PATENT DOCUMENTS

| | | |
|---|---|---|
| 5,696,501 A | 12/1997 | Ouellette et al. |
| 6,697,951 B1 | 2/2004 | Sinha et al. |
| 6,778,099 B1 | 8/2004 | Meyer et al. |
| 7,312,712 B1 | 12/2007 | Worrall |
| 7,406,364 B2 | 7/2008 | Andren et al. |
| 8,396,963 B2 | 3/2013 | Cowan et al. |
| 8,401,985 B2 | 3/2013 | Bickel et al. |

(Continued)

FOREIGN PATENT DOCUMENTS

| JP | 2012-244665 A | 12/2012 |
|---|---|---|
| JP | 2013-105371 A | 5/2013 |

OTHER PUBLICATIONS

Japanese Office Action dated Nov. 18, 2014 in Patent Application No. 2014-037388 (with English Translation).

*Primary Examiner* — Yuhui R Pan
(74) *Attorney, Agent, or Firm* — Oblon, McClelland, Maier & Neustadt, L.L.P.

(57) ABSTRACT

An energy management device includes a measurement manager and a communicator. The measurement manager manages energy information based on a physical quantity measured from at least one measurement object belonging to each of a plurality of energy types in a customer. The communicator communicates the energy information of each of the energy types to another device over a network.

10 Claims, 21 Drawing Sheets

(56) References Cited

U.S. PATENT DOCUMENTS

| | | |
|---|---|---|
| 8,423,194 B2 | 4/2013 | Besore et al. |
| 8,606,419 B2 | 12/2013 | Besore et al. |
| 8,751,955 B2 | 6/2014 | DeLuca et al. |
| 2006/0259447 A1* | 11/2006 | Kings .................. G01D 4/004 705/412 |
| 2009/0198384 A1* | 8/2009 | Ahn ..................... G01D 4/004 700/292 |
| 2013/0042124 A1* | 2/2013 | Isozaki ................. H04L 63/20 713/310 |
| 2014/0018969 A1* | 1/2014 | Forbes, Jr. ............. H02J 3/32 700/295 |
| 2014/0249976 A1 | 9/2014 | Sugimura et al. |

* cited by examiner

| ID | ROLE | INFORMATION ON CONNECTION AMONG DEVICES | | DEVICE INFORMATION (e.g., RATING) | | | OWNER INFORMATION |
|---|---|---|---|---|---|---|---|
| | | COMMUNICATION | POWER | CONSUMPTION | ELECTRIC POWER GENERATION | ELECTRIC POWER STORAGE | OWNER |
| 1 | MASTER METER | 2, 3, 4 | 2, 3, 4 | 10kW | 10kW | 10kW | FIRST OWNER |
| 2 | SUBMETER | 1, 5 | 1, 5 | 10kW | — | — | SECOND OWNER |
| 3 | SUBMETER | 1, 6 | 1, 6 | — | 10kW | — | SECOND OWNER |
| 4 | SUBMETER | 1, 7 | 1, 7 | — | — | 10kW | SECOND OWNER |
| 5 | CONSUMPTION | 2 | 2 | 10kW | — | — | SECOND OWNER |
| 6 | ELECTRIC POWER GENERATION | 3 | 3 | — | 10kW | — | SECOND OWNER |
| 7 | ELECTRIC POWER STORAGE | 4 | 4 | — | — | 10kW | SECOND OWNER |

FIG. 8

ENERGY MANAGEMENT DEVICE, ENERGY MANAGEMENT SYSTEM, AND ENERGY MANAGEMENT METHOD

CROSS-REFERENCE TO RELATED APPLICATIONS

This application is based upon and claims the benefit of priority from Japanese Patent Application No. 2014-037388, filed Feb. 27, 2014; the entire contents of which are incorporated herein by reference.

FIELD

Embodiments described herein relate to an energy management device, an energy management system, and an energy management method.

BACKGROUND

In addition to consumption, the advent of alternative energies of generation and storage of electric power diversifies the scheme of an interactive energy service (smart grid) between a public service company and a customer relating to investment, adjustment, and management. In conventional systems, public service companies such as an electric power company, gas company, and water company perform equipment management, capital investment, or the like in units of facilities of the customer, for the stabilization of energy supply.

Demand response control (interactive energy management with a fusion of communication and electric power), by which an electric power company integrally handles the aggregation of consumption, generation, and storage of electric power, is known. In this technique, consumption is controlled in units of facilities of a customer (household or industry) and generation and storage of electric power are controlled in units of facilities of an electric power company, but a method by which the public service company manages equipment in the facility of the customer is undisclosed.

In addition, a communication method between a master meter and a plurality of submeters, the purpose of which is to grasp electric power consumption information in the facility in a customer, is known. In this method, the exchange of the consumption information between a public service company and a customer is disclosed, but management including generation and storage of electric power is undisclosed.

As can be seen, conventional energy management systems carry out management only in units of facilities of the customer, which makes the unit (margin) of contract or adjustment larger, reducing the efficiency of accuracy of equipment management or capital investment for the stabilization of energy supply. Furthermore, conventional techniques have not disclosed specific methods pertaining to optimization of the entire energy infrastructure including generation and storage of electric power that provides a new trend, and integrated management of reverse power flow into a system, peak cut, and peak shaving.

There is a problem in that it is difficult to grasp roles including consumption, generation, and storage of electric power, and to carry out seamless management from a superordinate to a subordinate in an energy infrastructure.

BRIEF DESCRIPTION OF THE DRAWINGS

FIG. 8 is a diagram showing an example of configuration information in the energy management device according to the embodiment of the present invention;

DETAILED DESCRIPTION

According to one embodiment, there is provided an energy management device including a measurement manager and a communicator. The measurement manager manages energy information based on a physical quantity measured from at least one measurement object belonging to each of a plurality of energy types in a customer. The communicator communicates the energy information of each of the energy types to another device over a network.

Below, embodiments of the present invention will be described below further in detail, with reference to the drawings.

Figure 1:
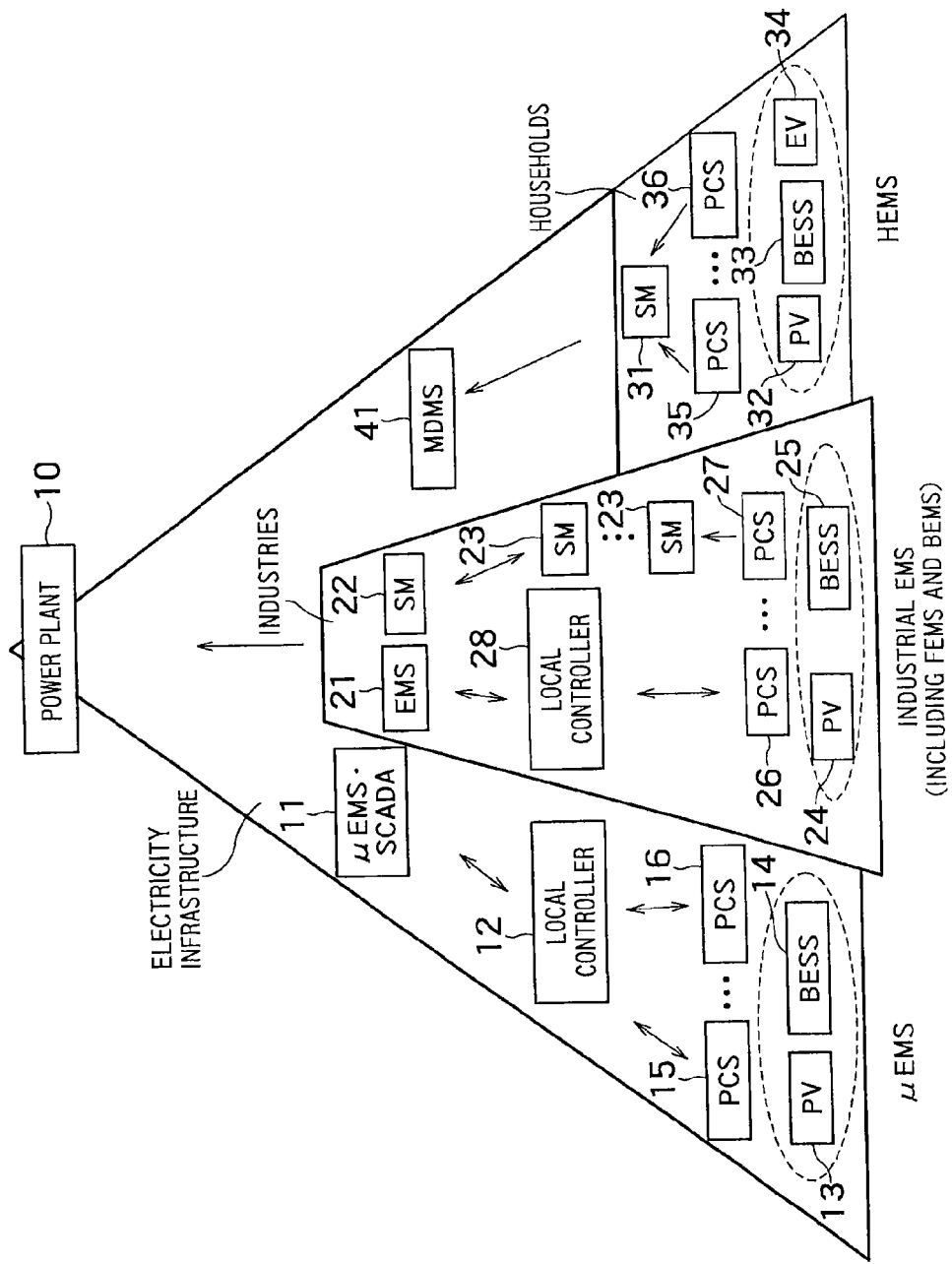
FIG. 1 is a diagram showing the entire system of an energy infrastructure in an embodiment of the present invention.

FIG. 1 shows the entire system of an energy infrastructure in an embodiment of the present invention. This entire system is also referred to as a smart grid or a smart community. Here, there are an electricity infrastructure, industry (commerce and manufacture), and household, as parties by purposes in a smart community.

The facilities in the electricity infrastructure are held by public service companies such as electric power companies. Investments, adjustments, and managements are performed for the electricity infrastructure to stabilize energy supply. The facilities of industry (commerce and manufacture) customers are held by owners of buildings, factories, or the like. Customers in the industry are each peculiarly referred to in accordance with the scale of the amount of energy to be contracted with a public service company. For example, when it comes to power, the customers are referred to as an extra high-voltage customer or a high-voltage customer in accordance with the scale of the amount of energy to be contract. According to the Electricity Business Act enforced in Japan, customers having a contract demand of 2,000 kW or more are classified as extra high-voltage customers as large-scale customers, and customers having a contract demand of 50-2,000 kW are classified as high-voltage customers. The high-voltage customers are further classified into small-scale customers and large-scale customers. Household customers are low-voltage-residential customers having a contract demand of less than 50 kW. Typically, the industry (commerce and manufacture) customers have a large number of facilities, and the facilities are installed across a plurality of floors. In contrast, the household customers have a small number of facilities, and the facilities are often installed for each single (one) role such as generation, storage, and consumption of electric power.

As shown in FIG. 1, centered about a power plant (utility control center) 10, the electricity infrastructure, the industry (commerce and manufacture) customers, and household customers exist. In the illustrated example, on an electricity infrastructure side, μEMS (micro Energy Management System)-SCADA (Supervisory Control And Data Acquisition) 11 is disposed, and under this, renewable energy generators (energy sources including a photovoltaic power generating system, a wind power generating system, a water power generating system, and the like) 13 and 14 are disposed with a control mechanism, such as a local controller 12, interposed therebetween. The renewable energy generators include a PV (Photovoltaic) system, or a BESS (Battery Energy Storage System). The BESS is classified as an energy storage system.

The renewable energy sources including a PV, wind power generation, and the like, and energy storages including a BESS and the like are connected to a PCS (Power Conditioning System)/inverters 15 and 16 that convert input/output power (AC/DC, DC/AC, DC/DC, and AC/AC). Although conceptually belonging to inverters, the PCSs each have an interconnecting function to an electric power system or the like when in particular connected to power supply system (electric power generation or electric power storage) such as a PV/BESS. For this reason, PCS/inverters may be referred to as PCSs rather than inverters, which implies 'to rectify power.' PCS/inverters may be described below as PCS/inverters when they do not need in particular to be distinguished. In addition, the combination of a PCS/inverter and a terminal electric power consuming device, a generator, an electric accumulator, and the like that are connected to the PCS/inverter, may be referred to as a power electronics device.

In addition, on the industry (commerce and manufacture) customer side, a master meter (smart meter) 22, a local controller 28, a submeter (smart meter) 23, a PV 24, and a BESS 25 exist around a customer-side EMS 21. The PV 24 and the BESS 25 are connected to PCS (Power Conditioning System)/inverters 26 and 27. A customer-side EMS for a building, which is in a commercial field, is referred to as a BEMS (Building Energy Management System), and a customer-side EMS for a factory, which is in a manufacture field, is referred to as a FEMS (Factory Energy Management System).

In addition, on the household customer side, a master meter (smart meter) 31, a PV 32, a BESS 33, and an EV (Electric Vehicle) 34 exist. A household customer-side EMS is referred to as a HEMS (Home Energy Management System). To the PV 32, the BESS 33, and the EV (Electric Vehicle) 34, PCS/inverters 35, . . . , 36 are connected.

What is installed in the utility control center in the power plant 10 of an electric power company, which manages the amount of power generation of nuclear power, thermal power, or water power, is an EMS (Energy Management System), a so-called superordinate EMS, and under this, a plurality of μEMSs exist to manage a power distribution network. The μEMS further manages the facilities of a plurality of customers (industrial customers and household customer). On the premises of the customers, electric power consuming devices such as air conditioning and illumination are installed together with a general purpose inverter, and a power supply system device, for example, a BESS/PV, is installed together with a PCS. A conventional electric power converter, equivalent to the PCS, mainly performs one-way communication including remote update of firmware, but the development of a smart grid or a smart community allows the tide of interactive communication including controls to appear. The local controllers 12 and 28 in FIG. 1 efficiently manage (monitor the control of) a plurality of BESS/PVs installed in the inside thereof, and allow subordinates to be shown as one aggregate to the superordinate, and each have various standard protocol interface schemes.

Here, in addition to the cooperation between an EMS of a superordinate, and a local controller and an inverter/PCS, there is a form of cooperation between inverter/PCSs (e.g., PCS 26, . . . , 27). For example, conceivable forms include power sharing control (autonomous cooperation) within an electrical power reception capability (electrical power handling capability), synchronized operation (autonomous cooperation) of a plurality of power source, and continuous operation (autonomous cooperation) in a blackout.

Specifically, power sharing control includes virtualization cooperation, failsoft, and efficiency optimized operation. In the virtualization cooperation, among a plurality of inverter/PCSs, an inverter/PCSs being a master acquires a total power demand, and performs control by allocating the shares of electric energy to a plurality of slave inverter/PCSs to make the plurality of inverter/PCSs appear to operate as the one master inverter/PCS to the superordinate. In the failsoft, a master that detects a failure of an inverter/PCS in the system performs control by redistributing the electric power share that the faulty slave shares so as to maintain the total power demand. In the efficiency optimized operation, when the total power demand falls below the maximum rating of a group of a plurality of inverter/PCSs, a master distributes the shares of electric energy so as to maximize the operation efficiency of each slave and reduce the number of operating slaves, to improve the efficiency of the inverters as the entire system.

In addition, the synchronized operation is to control, at the time of causing a plurality of inverter/PCSs to operate in parallel, power source phase (electric power phase) among the inverter/PCSs in order to increase the electric power output. In the power source phase control, the inverter/PCSs are synchronized with each other by communication with respect to the occurrence of cross current in an AC-side output. The cross current includes reactive cross current flowing due to the difference in electromotive force, synchronization cross current flowing due to the phase difference of electromotive force, and harmonic cross current flowing due to the difference in waveform of electromotive force. Control and management of both voltage and frequency are indispensable for the power source phase control. The frequency is typically monitored by providing signal information from the outside.

It is conceivable to intentionally install a function of monitoring the frequency from the beginning the design of the inverter/PCSs. Subsequently, an inverter/PCSs taking a role as a master controls the whole, manages the voltage and frequency of itself, and manages and controls the voltages and frequencies the surrounding inverter/PCSs. For such cooperation among the inverter/PCSs, cooperation with an EMS and a smart meter is important.

The power plant (utility control center) 10 generates large capacity power from a fuel source such as thermal power and nuclear power, and supplies the power to a customer side such as industry (commerce and manufacture) and household through an electricity infrastructure such as a power distribution network. As described above, in the embodiment of the present invention, the power distribution network from the power plant 10 to the customer is collectively called an electricity infrastructure (electric power system network). A renewable energy generator (PV and wind power generation) installed in the electricity infrastructure generates electric power from energies existing in the natural world. The renewable energy generator supplies, as with the power plant, electric power from the electric power system network to the customer through the power distribution network. Installing the renewable energy generator on the electric power system network enables operation taking the loads of the power plant into consideration. In contrast, BESS installed in the electricity infrastructure stores the electric power generated by the power plant or the renewable energy generator.

A μEMS or SCADA 11 manages the stabilization of the whole system including supply power of such a power plant or renewable energy generator and demand power consumed on the customer side, using both an electricity network and a communication network. For example, it is conceivable that the μEMS or SCADA 11 performs stabilization control at the time of islanding a system in an isolated island, community, or the like, stabilization control (ancillary service) at the time of connecting a system, performs control of medium voltage and constant voltage for electrical distribution network, and performs fluctuation suppression control of BESS/PV/EV.

In contrast, the effect of installing BESS in a customer relates to management in accordance with contract demand with an electric power company. The contract demand includes the contract value of maximum power consumption in a peak time period, or the contract value of a voltage or frequency when renewable energy power is sold by way of reverse power flow. For example, in the case of power consumption, if an electric power consumed by a customer exceeds the contract demand, the electric power company imposes a monetary penalty for a breach of the contract. For this reason, the customer manages contract demand, using a BESS, by performing peak cut to suppress a power consumption (W) at the peak, or peak shaving to flatten the whole electric energy consumption (Wh) per day. In the BESS, surplus power is stored by storing electric power generated by a renewable energy generator such as a PV, or by storing nighttime power.

In addition, at the time of reverse power flow, in order to stabilize the electricity infrastructure, if the customer does not perform management within a prescribed voltage or frequency determined by countries or regions, the electric power company also imposes a monetary penalty for a breach of the contract. Also in this case, the fluctuation due to the electric power generation by the renewable energy generator can be restrained by using a BESS.

Note that electricity charge systems provided by an electric power company include one that gives a preferential electricity charge in accordance with a power factor. This is a measure mainly for a large-scale customer such as a commercial or manufacturing customer. The average value of a power factor is calculated from an active energy and reactive energy every certain period, and measures such as discounting the electricity charge.

The energy management relating to a contract between the electric power company and the customer as described above is seen from various viewpoints. These can be classified as major conceptual categories, specifically, demand management (peak cut/peak shaving) and reverse power flow management. In a smart grid field, which is a fusion of electricity network and communication network, consideration is underway regarding a scheme of interactive energy management between the public service company (electric power company) and the customer. This scheme is called a demand response. The demand response will be described in detail here.

With respect to the demand response, important viewpoint between the electric power company and the customer is to define what the electric power company or the customer does after defining the location of responsibility (location of the owner). For this reason, technologies to implement the demand response include a plurality of forms according to the location of the responsibility.

A form in which full responsibility is located on an electric power company side is direct load control demand response. A customer side has no room for determination, and the electric power company directly manages the electric energy consumption of the customer. This is called a direct load control contract, including a scheme as well as being a contract for the location of responsibility.

In contrast, a contract model in which both the electric power company and the customer have the location of responsibility is negawatt power trading demand response. The electric power company inquiries a suppression amount of power consumption (e.g., how many kilowatts) to the customer side, the customer tries suppressing the power consumption on the customer's responsibility. When the customer successfully suppresses the power consumption, the customer gains a monetary incentive from the electric power company, or is imposed a monetary penalty if fails.

In a monetary aspect, it is difficult to uniformly treat all the electric power conditions or regulations, which differ according to countries or regions. Taking Japanese Electricity Business Act as an example, industry (commerce and manufacture) adjust a basic charge (unit price per 1 kW) of the electricity charge to the highest peak. Besides, the customer performs suppression control on electric power to lower the basic charge for the customer's convenience, which is called demand control. Further taking the electric power company's convenience into account in addition to the customer's convenience, the suppression of electric energy is interchanged, which is called demand response.

For this reason, there is a certain concept for a stance on introducing capital investment on the customer side. That is, the concept is to make an amount obtained by subtracting the amount of capital investment for energy saving control from the sum of the amount of saving of the basic charge due to the demand control and the additional amount of an incentive due to the demand response greater than zero. Between the basic charge and the electricity charge, the former must be paid regardless of the power usage. The demand management (demand control/demand response for peak cut/peak shaving) is categorized as the adjustment of the amount of demanded for stable electric power supplying from the viewpoint of the electric power company, and is categorized as the adjustment of the basic charge from the viewpoint of the customer side.

A smart meter (master meters) installed in a customer such as industry (manufacture and commerce) and a household measures electric energy consumed in the facilities on the customer side, and periodically notifies a management server of an electric power company. The management server is typically referred to as a MDMS (Metering Data Management System). FIG. 1 shows a case where the smart meter 31 of a household customer periodically notifies the measured electric energy to the MDMS 41. Similarly, the smart meter 22 of an industrial customer may periodically notify the measured electric energy to the MDMS. The MDMS can perform one or both of the calculation and the prediction of the total amount of demand power on the customer side. A BESS installed on the premises of the customer stores power supplied from a system network of the electric power company, or power generated by a PV on the premises. An EV stores power to an onboard battery via a charger. In addition, in the industry (commerce and manufacture) customer, a submeter exists.

A smart meter (master meter or submeter) is a next-generation watt-hour meter, which digitally measures power and has a communicating function inside the meter, unlike a conventional analog induction watt-hour meter. A conventional analog watt-hour meter includes current coils and voltage coils disposed therein based on the principle of Arago's disk, and these coils drives a disk of the measuring instrument, generating torque. The watt-hour meters vary by an operating principle, structure, and application, and in an ordinary household, a watt-hour meter that adds up and measures active power of AC power is installed, and an inductive watt-hour meter through which a rotating disk included therein can be seen. Specifically, the watt-hour meters include a plurality of kinds, such as an inductive watt-hour meter, a reactive energy meter, a precision type combination meter, and a demand meter. The inductive watt-hour meter shows electric energy by needles provided for each digit, or generates a pulse signal every time the electric energy reaches certain values. The precision type combination meter is an electronic meter, which includes a dynamometer, a reactive energy meter, and a demand power meter incorporated therein and is installed in a large-scale customer. The demand meter is an electric meter, which measures a maximum power value in a certain period. The watt-hour meter used for the trade, as a property of the electric power company, is sealed by the electric power company after being installed. In contrast, the submeter (child meter) has functions equivalent to the above-described watt-hour meter, but there are cases where right and duties of an owner belong to the electric power company and where the right and duties of an owner belong to the customer. A smart meter to which a communicating function (intelligent function) is added with respect to the analog watt-hour meter is applicable to automated meter reading as well as various services, by utilizing the communicating function.

Here, the smart meter will be described in detail. The most striking characteristic of the smart meter is in that interactive communication can be performed between a public service company (electric power company, water company, or gas company) and a customer. In addition to a function of transmitting at an interval, for example, once a day, the smart meter has an intelligent function of receiving command values from the superordinate electric power company. For example, when falling into an undersupply, the electric power company performs demand response to request a customer who understands the demand response better, to suppress the consumption, after the confirmation thereof.

A customer who provides cooperation to the demand response is given a monetary incentive. In addition, renewable energies including PV become widespread, which causes the trend toward electric power generation also on customer side. Checking how much the electricity charges are at that point is also an important role of the smart meter.

With respect to the information exchanged in the communication of the smart meter, information to be uploaded mainly includes the amount of consumption (various pieces of consumption amount information such as a cumulative value and an instantaneous value). This upload is performed at a frequency being, for example, once every about 15 minutes. Whether to contain information on the prediction (demand) of the amount of consumption in information to be uploaded is optional. A communications infrastructure typically includes a relay called a concentrator/transformer. One concentrator accommodates a large number of smart meters. A conceivable connection between an MDMS and the relay is an optical fiber. A conceivable form of the communication between the smart meter and the relay includes both wired communication and wireless communication. Specifically, methods by which the smart meter uploads the meter information to a superordinate MDMS includes one in which the meter information is delivered to a HES (Head End System) by way of a concentrator (aggregating device), using a fiber-optic network of the public service company. In addition, another method is to directly deliver from the smart meter to the HES not through a concentrator but through a wide-area radio channel.

A master meter, which is smart meter, is a property of the electric power company, and is installed per contract with the electric power company or customer, or installed per household. The premises of the master meter also apply to not only in the household field but also buildings or factories being in the industrial field (commerce and manufacture). In contrast, a submeter is a property of the developer or management owner of a building or factory. In the facilities in the industrial field, the amount of energy consumption differs according to places such as floors and rooms, but electricity charges sharing has conventionally been calculated based on area ratios.

This has a problem in that, in terms of energy saving or charging, the amount of energy consumption has to be correctly grasped in accordance with the usage. The submeter is installed beside a building, floor, or main facility to grasp the consumption of which area should be managed. Submeters do not need to be placed all the places, and a conceivable form of installation is to place submeters where a developer or management owner intends to place them. For example, a large factory has a case where it is desired to save electricity while not stopping a mission critical rolling mill in the factory. Consumption management in such a case includes individual consumption management using submeters. A master meter has high precision requirements because it is directly linked with charging, and the replacement period thereof is typically about ten years. In contrast, a submeter measures with middle precision because the measurement is on a best effort basis, and the replacement period thereof is about several years. Installing a wireless communicating function such as ZigBee/wireless LAN to a submeter is typically conceivable. For example, using a communicating function to transmit a report/alarm from a submeter to a central control room in a facility is conceivable.

The way to manage the energy from electric power, gas, and water differs according to countries or regions. For example, the energies are individually managed in Japan and the United States, while they are integrally managed in the United Kingdom. Although the way of the management varies, there may be a case where communication is required to be seamless (integrated). Taking hardware and software for control and communication into account, communication hardware and software protocols may move toward the integration in conformity with smart meters. As to control, although there is a competition among control packages provided to customers, trying the unification of communications brings the unification of controls into a standard with the most used service or smart meter.

In addition to the smart meter, the BESS/PV, which is a new trend of energy systems, will be further described. An assumed application of the BESS on the electric power company system side is to be utilized for implementing a function called an ancillary service (Micro Load Frequency Control). The ancillary service is a service to adjust an output in seconds in response to instantaneous load changes to stabilize a system, in order to maintain the electrical power quality such as frequencies or voltages in the system. In addition, an application of the BESS on the industrial or household customer side is to be utilized for implementing a function called peak shaving (all-day operation). The peak shaving is an operation to store nighttime power, the unit price of which is inexpensive, and to flexibly use the power in a time period in a daytime when power uses are concentrated.

Now, important factors in considering a BESS are how much, at which timing, and for how long electric power is charged/discharged. An image of a power (W) is a faucet, and an image of an electric energy (Wh) is a bucket, being the integration thereof in hours. The cost down ratio of investment for the BESS decreases year by year. When the cost down ratio exceeds a certain threshold value, the relationship between the amount of incentive for an investment due to an electric power price difference between nighttime and daytime, and the length of a payback period of an initial cost, is reversed. Since the lifetime of the BESS is reduced every time charging/discharging is performed also during the payback period, whether or not the total amount of investment including a maintenance cost can be paid back is an important viewpoint.

In contrast, with respect to a PV, it is conceivable that the introduction of FIT (Feed-In Tariff) increases the incentive to sell electricity, and reduces the payback period to the initial cost. For management of the PV, conceivable methods includes one to perform a centralized electric power control, as well as one to perform variant electric power control in which a plurality of PVs are arranged to operate. In addition, the system of FIT, and the relation between the electricity selling charge of a renewable energy generator and the electricity buying charge from the electric power company differ according to countries or regions, and this applies to electric power retail business (a form in which PV power generation+buying insufficient electricity from the electric power company and selling surplus electricity). In retailing electric power with renewable energy power generation by the PV or the like, the cooperation with the smart meters may be particularly an important viewpoint.

As described above, in the energy system (the example of FIG. 1 is mainly an energy system relating to electric power), the smart meter (master meter and submeter), BESS, and PV appear as a new trend. There will be shown below the embodiment to solve the known problems by installing a communicating function and control function to these devices and causing them to cooperate. The description will be made below by taking a case where an industry customer is particularly targeted at, as an example.

Figure 2:
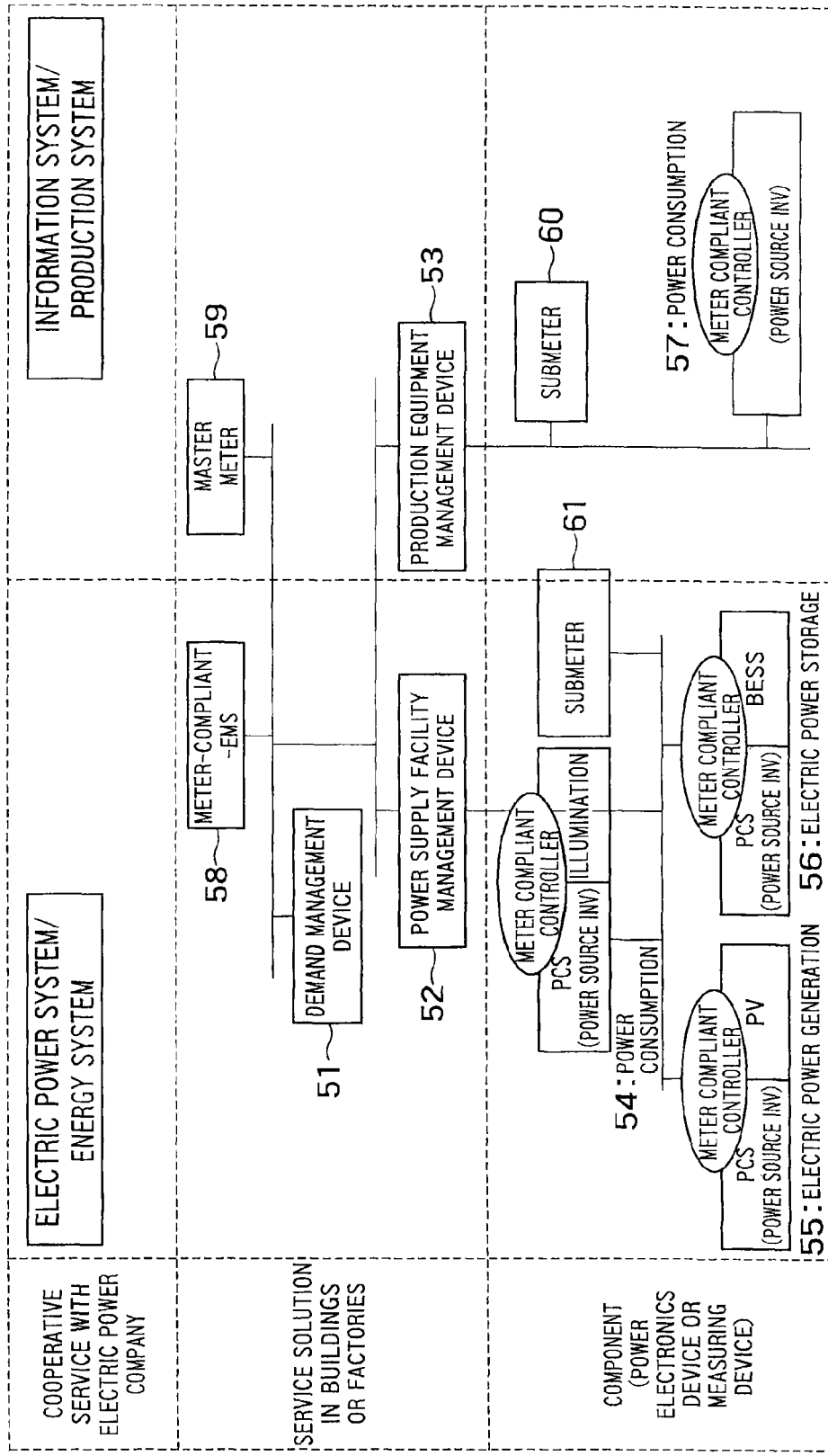
FIG. 2 is a diagram of an industrial field system of the energy infrastructure in the embodiment of the present invention.

FIG. 2 is a diagram showing the system configuration of a customer on the industry (commerce and manufacture) side in FIG. 1 further in detail. As shown in FIG. 2, there are categories of, from the viewpoint of the customer, a cooperative service with a public service company including an electric power company, a service and solution in a building or factory, and component (power electronics device and measuring device). Furthermore, the whole system configuration can be categorized into a power system/energy system and an information system/production system. The former category is denoted by a vertical axis in FIG. 2, and the latter category is denoted by a horizontal axis in FIG. 2. The power system/energy system handles various pieces of energy information such as electric power, water, and gas. In addition, the information system/production system handles information unique to various pieces of production equipment. Each system will be described in detail.

As an example of services in the power system/energy system is to perform demand management and power source equipment management relating to the electric energy of a power consuming, generating, accumulating component or the like existing at the end. Examples of a function of performing these managements in the case of using a BESS/PV include frequency control, power factor control, schedule control, monitoring control of the operational status an energy storage, control for long lifetime as an energy storage system, distribution of optimal command values (charging/discharging), peak cut/peak shaving control, BESS/PV cooperation control (absorption of surplus power, reverse power flow for electric power trading). Note that the drawing shows a demand management device 51 to perform the demand management and a power supply facility management device 52 to perform the power source equipment management.

The illustrated example shows a case where these devices are one of forms of a local controller, but it is conceivable that the functions of these devices are divided among devices such as a superordinate EMS, local controller, and BESS/PV in accordance with the scale of the system configuration. For example, in a case of a large-scale system, a conceivable form is one in which an integrated controller that controls a plurality of local controllers is disposed, and the integrated controller cooperates with the superordinate EMS. In this case, in order to enable offline operation if communication connection with a superordinate system is cut off, part of the control function of the superordinate EMS can be installed in the integrated controller or a local controller in its subordinate. In contrast, in a case of small- or middle-scale system, it is assumed that the function of the local controller is installed directly in a PCS. According to the scales of the system configuration, the distribution of a communicating function and a control function includes cases ranging from a case of having subset function of the EMS to a case of performing what the superordinate EMS instructs as it is. In addition, from the viewpoint of energy management, the efficiency of power consumption such as air conditioning or illumination can be improved by performing power consumption control. In particular, with respect to the combination of a highly efficient motor and an inverter, the efficiency of the whole system is further improved by not only improving the performance of a single device, but also installing communication and control functions, and further causing a plurality of devices to cooperate with one another. Note that, in the case of things relating to electric power, information mainly handled here includes a plurality of forms in units of such as an electric power (W), current (A), and voltage (V), from each of the viewpoints of the electric power company, the customer, and individual device itself.

Now, with respect to water and gas, which are energies other than electric power, the introduction of cogeneration in a customer can be mentioned. The cogeneration is one of energy supply system in which power, heat, and cold energy are extracted using waste heat from an internal combustion engine, an external combustion engine, and the like to improve the total energy conversion efficiency. The term "cogeneration" is abbreviated as "kojiene" in Japanese. For example, a gas turbine engine system generates steam from exhaust that is discharged from a gas turbine engine for electric power generation. The gas turbine engine system is efficiently used in a steam-using facility, for producing cold energy by a steam absorption refrigerating machine or the like. In particular, electric power generation combining a gas turbine electric power generator and a steam turbine power generator that uses the waste heat thereof is referred to as combined cycle power generation. In addition, in a gas engine system, the combined cycle power generation means producing steam with an exhaust waste heat boiler of a gas engine for electric power generation, or heating running water with engine cooling water. Furthermore, in a fuel cell system, electricity is produced from hydrogen and oxygen in the air, and heat generated as a side effect is collected as steam or hot water. In addition, there is a diesel engine system in which exhaust waste heat from a diesel engine for electric power generation is used to produce steam or to supply hot water, and running water is heated by engine cooling water to be supplied. Measuring these electric power, water, gas, and the amount of heat with meters enables improving the efficiency of the whole system.

The information system/production system handles information other than information on energy management. As a specific application, the information system/production system targets at a boiler plant, a steel manufacture, and or a facility peculiar to a production factory for electrical machinery/machinery. Here, a local controller (production equipment management device) 53 performs sequence control (Programmable Logic Controller control), instrument control (Process Automation Control, or analog control on temperature, water volume, or the like), computer control, and the like. Requirements for the system differ according to applications. For example, in the boiler plant the system of which should never be stopped, device replacement in downtime is performed while leaving the system operating, with high robustness taken into account. In contrast, rolling rolls in a steel manufacture factory, the rotations of which are adjusted by measuring the tensions of motors on a plate-like base having a total length of several hundred meters, have real-time requirements.

As described above, an industry (commerce and manufacture) customer consumes power as well as has various energy sources. Furthermore, a local controller to be a key to communication and control also has various requirements. Specifically, a local controller that mainly serves in electric power and energy management, and a local controller that mainly serves in an information system/production system other than the energy management are conceivable.

The components (power electronics devices) in FIG. 2 will be described further in detail. In the drawing, there are electric power consuming devices 54 and 57 such as air conditioner and illumination, an electric accumulator 55 such as a BESS, and a generator 56 such as a PV.

For example, the BESS is configured by an energy storage (BMU: Battery Management Unit) and an electric power converter. The electric power converter is called an inverter, converter, or a PCS (Power Conditioning System), which takes roles of converting the input/output of electric power, or adjusting the voltage.

The energy storage (BMU) includes, in addition to a battery pack having a plurality of battery cell, an internal processor that manages the internal state of the battery pack. By including them, the energy storage performs on electric power charging and discharging control based on a request from the PCS. The energy storage (BMU) notifies information such as a rated voltage, a maximum current value in charging or discharging, a charging rate (SOC: State Of Charge), and a lifetime rate (SOH: State Of Health) to a controller or a PCS that controls the energy storage.

The PCS exchanges DC power between energy storages, and exchanges AC power between electric power system networks. The PCS performs DC/AC conversion and voltage fluctuation suppression. Controlling these functions of the PCS may be implemented by a processor being in an external connection with the PCS. In addition, conceivable forms to implement controlling and monitoring between the energy storage (BMU) and the PCS includes one to use a CAN (Controller Area Network), one to use a wired communication medium such as Ethernet, one to use a wireless communication medium such as a wireless LAN, and further one to use an electric signal line that is uniquely developed by a vendor selling the product.

The power electronics devices in FIG. 2 each include a controller compliant with the specification of a meter. The power electronics devices each communicate with various EMSs 58 and local controllers 51, 52, and 53 by means of the communicating function of the controller. This controller may be one form of the energy management device according to the present embodiment. The EMS or the local controller acquires information on such as a SOC and SOH from the BESS to appropriately monitor the state of the energy storage that changes every moment. The instructions of charging and discharging control can be provided based on the monitoring. The energy storage typically has a characteristic of self-discharge.

The PV, which is a generator only discharging, may be used for failure prediction or the like by monitoring the state of a panel of the PV to collect information. Although not shown in FIG. 2, an EV (Electric Vehicle) has a configuration similar to that of the BESS. The EV differs in that it has a first electric power converter that is connected to an energy storage to operate and as well as a second electric power converter that operates as a charger.

Information relating to electric power such as consumption, generation, and storage of electric power is expressed as, in addition to an electric energy in Watt hour (Wh), the amount of current in Ampere hour (Ah), a voltage in Volt hour (Vh), an instantaneous electric energy (W), or the like.

In the case of the BESS, a typical charging method for an energy storage (BMU) is constant-current charging. In this method, electric energy (the amount of current) input/output by battery cells in the energy storage (BMU) remains in a certain state until the SOC expressed in percentage reaches a predetermined threshold value. For this reason, acquiring an SOC value from the energy storage (BMU) allows for calculating a possible charge time and a possible discharge time, a maximum charging/discharging power, and electric energy (the product of the possible charge/discharge time and the power) required for charging/discharging, which are associated with the information. The constant-current charging has a characteristic in that the amount of current required to charge is minimized after the SOC exceeds the predetermined threshold value. This characteristic allows for roughly calculate information required for a charging/discharging plan.

A communicator of each power electronics device can be implemented by, for example, a wired communication medium such as an optical fiber, a private line, and Ethernet, as a physical communication medium. In addition, the communicator can be implemented by a wireless communication medium such as a 2.4 Ghz/5 GHz wireless LAN and 920 MHz radio, or can be implemented by a CAN, RS-232/RS-485, or the like. In addition, various standard protocol interface systems can be installed on these communication media. The values of a battery cell in the BESS, which has a characteristic of self-discharge, change every moment. For this reason, it is conceivable that the BESS notifies information such as an SOC and SOH to an EMS, a local controller, or other power electronics devices.

Now, additional description will be made with respect to the scheme of a standard protocol interface in industry (commerce and manufacture). As described above, a building or factory includes a terminal component (power electronics device and sensor/measuring device), a local controller, and a server device. The server device performs IT (Information Technology) management, security management, and energy management using information acquired from the component and the local controller.

In general, in the industry (commerce and manufacture) field, a system supplier (solution company) of facilities in the building or factory defines a standard protocol interface from the viewpoint of enclosing each company. A component company that provides a power electronics device/local controller to the solution company may perform selections of a scheme and communication hardware for various devices including the local controller, implementation of communication hardware/software, and integrating development of control hardware/software, in order to support each scheme. For example, there are a very large number of schemes such as PROFInet/PROFIBUS, CC-LinkIE/CC-Link, EtherNetIP/DeviceNet, and ModBusTCP/ModBus. Consequently, the system supplier provides the whole solution in the form of combination of the power system/energy system and the information system/production system for each application to the building or factory, and the contact point with the electric power system on the electric power company side is mainly a master meter only.

Against such a backdrop, information on electric power/energy in a conventional facility of industry (commerce and manufacture) is difficult to directly grasp for the public service company of electric power, gas, water, or the like that provides the energy. The unit for management, adjustment, investment of electric power/energy is determined for each facility, which makes the unit (margin) large and is problematically inefficient.

In contrast, in the embodiment of the present invention, as presented in FIG. 2, seamless management from a supply side to a demand side is performed through a master meter 59 and smart meters such as submeters 60 and 61. This improves the accuracy (estimated value) of control and measurement of energies such as electric power (generation, consumption, and storage of electric power), gas, and water. The public service company and the customer are thereby enabled to perform margin-less (having a fine adjustment) investment, adjustment, and management.

Figure 3:
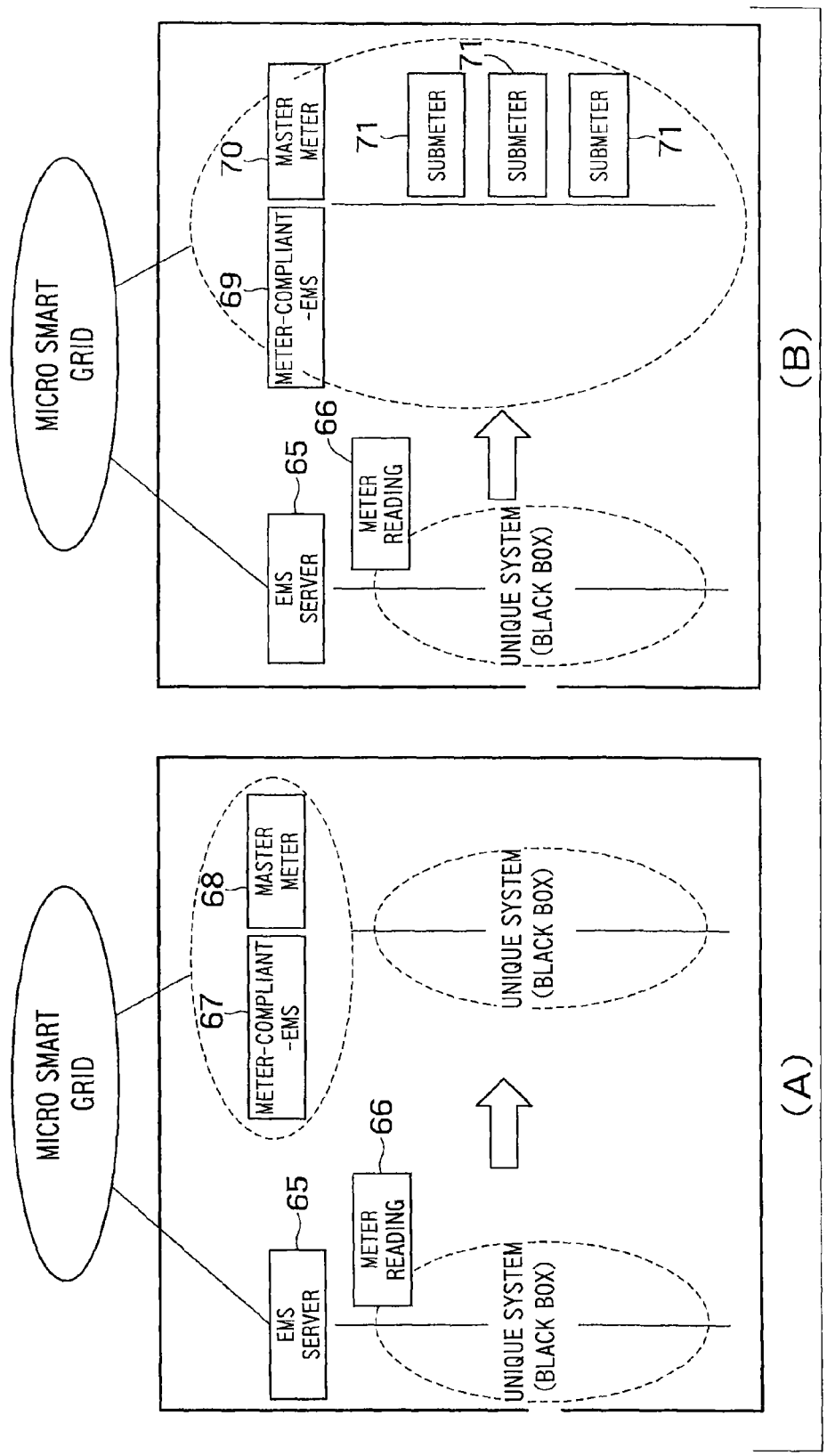
FIG. 3 is a diagram for illustrating a main point of the embodiment of the present invention, comparing with a known art.

As shown in FIG. 3(A), in a system configuration based on a conventional technique, the inside of a facility of a customer is a black box for a public service company. With the conventional technique, the management of the customer is efficiently performed on a configuration in which electric power is measured by meter reading 66 while using a server (EMS) 65, by replacing the server with a meter-compliant-EMS 67 and a master meter (smart meter) 68. However, the inside of the facility of the customer is still a black box.

In contrast, in the embodiment of the present invention, as shown in FIG. 3(B), in addition to an EMS 69 and a master meter 70, a submeter 71 is disposed. Integrating their specifications enables a seamless management from the public service company to the customer. In particular, with the conventional technique, it has been a mainstream manner to make a contract of charging between the public service company including an electric power company and the customer, every substantial period. However, the diversification of energy environments, which is represented by demand response, gradually changes the foundation. For example, the advent of micro trading, in which trading of power, gas, and the like between a public service company and a customer through a wholesale market in a minute level, is conceivable. The optimization of the energy of such a system as a whole is difficult to realize with an individual management method as shown in FIG. 3(A).

The embodiment of the present invention will be described further in detail below.

A first feature of the embodiment of the present invention is cooperation among the public service company, the EMS (meter-compliant-EMS) and the master meter. This cooperation serves as a contact point of interactive energy management (demand management and reverse power flow management) between the public service company and the facility of the building and factory. The EMS cooperates with a superordinate EMS or the like of the public service company side to manage energy of various devices (e.g., power electronics device and local server) in the customer.

A second feature of the embodiment of the present invention is cooperation between the master meter and submeter. This cooperation enables minute energy management. This allows the public service company including an electric power company to grasp energy in the facility of building and factory. This corresponds to, as described above, integrating the plurality of existing standard protocol interfaces into a configuration centering about smart meters.

A third feature of the embodiment of the present invention is cooperation between the submeters and the power electronics devices (inverter/PCSs) of consumption, generation, and storage of electric power. This cooperation enables the method of realizing minute energy management (demand management and reverse power flow management) and the provision of accompanying services.

Figure 4:
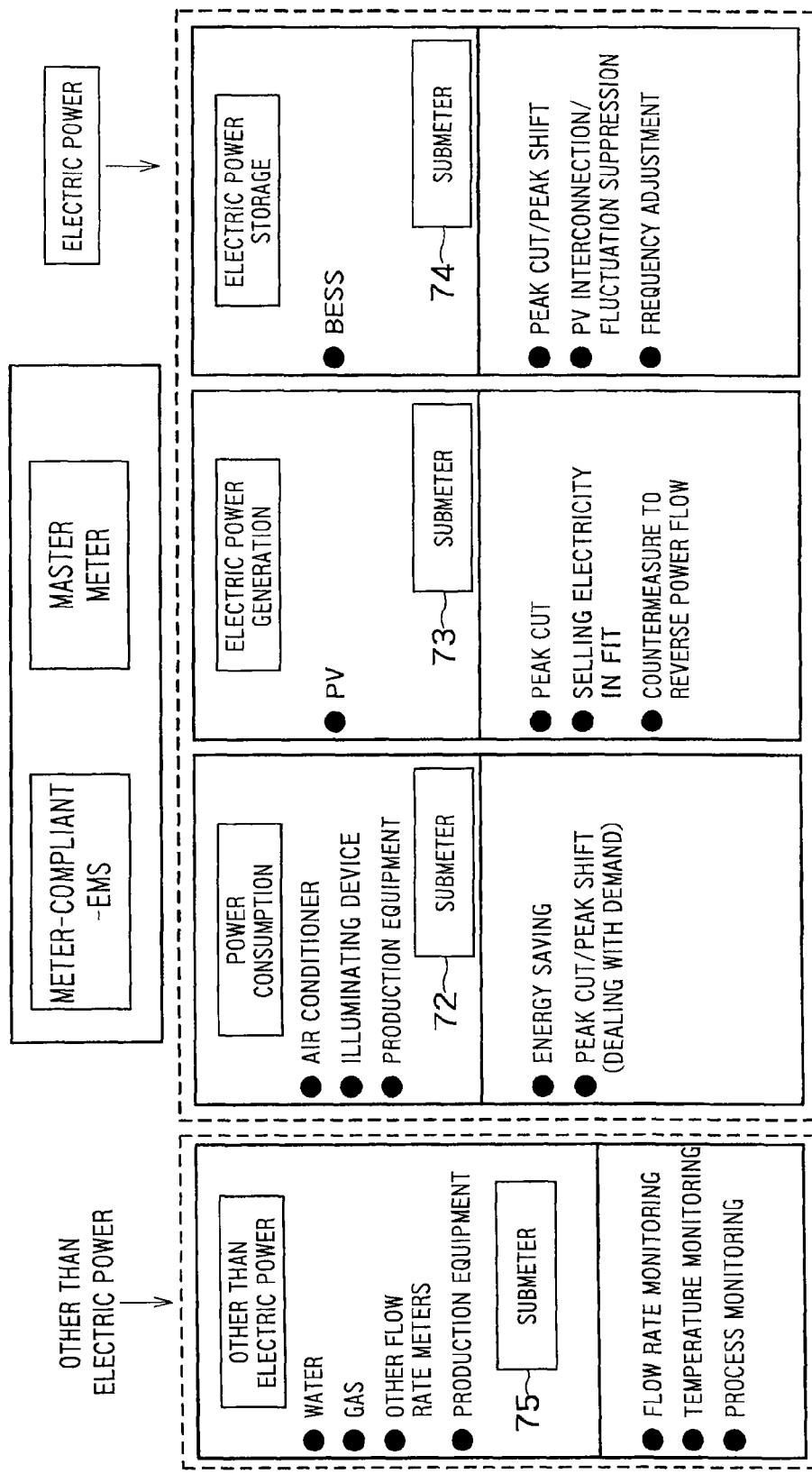
FIG. 4 shows categories of device roles in a customer from the viewpoint of the energy management device according to the embodiment of the present invention.

FIG. 4 presents concept of grouping devices in a customer for each role through the energy management device according to the embodiment of the present invention. The energy management device according to the embodiment of the present invention can be installed in a smart meter such as a master meter and submeter, or can be installed in a terminal power electronics device (e.g., inside a PCS), or a local controller.

As shown in FIG. 4, facilities in buildings or factories in industry (commerce and manufacture) can be roughly categorized into energy relating to electric power, and energies relating to those other than electric power. The energy relating to electric power may be further categorized into three kinds of consumption, generation, and storage of electric power. The power consumption is configured by facilities such as an air conditioner, illuminating device, and production equipment (in particular, a portion relating to power consumption). Submeters 72, 73, 74, and 75 exist for energy types such as power consumption energy, electric power generation energy, electric power storage energy, and other energies, and a submeter may exist for each or a plurality of devices of the same energy type. Note that one submeter may support a plurality of energy types.

The energy management here is based on the contract of a basic charge and electricity charge between the public service company and the customer. The public service company including an electric power company determines a basic charge in accordance with a maximum power consumption in a peak time period for the purpose of stabilizing the energy infrastructure. If the power consumption of a customer exceeds this contract demand, a monetary penalty is imposed for a breach of the contract. For this reason, a customer performs peak cut to reduce a power consumption (W) at the peak, or peak shaving to shift power consumption at the peak to another time period while keeping the whole electric energy consumption (Wh) per day.

In power consumption management in industry (commerce and manufacture) customer, a conventional practice is to set analog sensors, and to transmit a report/alarm to central control room/common area when a power consumption (W) reaches a preset value. However, these sensors only generate pulse signals to notify them to a particular device. Thus such power consumption management is typically configured to exclude power consumption in an industry customer from management objects of a superordinate system such as the public service company.

Alternatively, it is conceivable to perform demand prediction (placing sensors in the customer to simulate the prediction of a trend) for a large-scale customer such as steel manufacture and paper manufacture, and to provide the result of this prediction to the electric power company, with which an operator manually deals using telephone or email. Unfortunately, this does not go as far as to automate the control.

The application of energy management in an industry customer is energy management such as peak cut on the customer side, or selling electricity by supplying the electricity (reverse power flow) to the energy infrastructure managed by the public service company including an electric power company. The advent of renewable energy generators such as a PV and wind power generation enables a customer itself to take a role of a power plant.

However, from the viewpoint of the public service company, in order to stabilize the energy infrastructure, for example, it is necessary for an electric power system network to operate while controlling a voltage and frequency that are determined by countries or regions within certain criteria. Also on customer side that sells electricity in connection with this, a reverse power flow exceeding the above-described criteria may cause a monetary penalty imposed for a breach of a contract. Note that conceivable forms of reverse power flow include a case where the public service company carries out investment and management, and a case where the customer carries out investment and management.

As described above, the BESS has a role as a buffer of electric power. With this, the public service company including an electric power company or the customer performs energy management of power consumption (peak cut/peak shaving), or energy management (reverse power flow management/frequency adjustment) relating to PV fluctuation suppression.

In contrast, energies relating to those other than electric power in FIG. 4 include various energies relating to energy sources such as water and gas, as well as a flow rate, temperature, and process, being various pieces of sensor information on production equipment. As described above, there are various schemes of energy management according to countries or regions. One of the schemes is to integrate electric power, water, and gas and allow a single public service company to provide it, and the other is to divide them and allow a plurality of public service companies to separately provide them.

In particular, in the circumstance of the latter, a particular public service company may not necessarily manage all the energy information together in buildings or factories in industry (commerce and manufacture). For example, what an electric power company needs as an object of energy management is energy relating to electric power, rather than water or gas. In contrast, a water company does not need energy relating to electric power.

As described above, in the embodiment of the present invention, as shown in FIG. 4, the devices in the customer are grouped for each role (for each energy type), and are accommodated in the submeter. The submeters each have an interactive communicating function and control function between the superordinate and the subordinate.

Methods of accommodating the submeters include one to associate devices with submeters using a physical configuration. Additionally, a conceivable method is to associate the devices with the submeters using both physical and logical configurations.

The physical association as the former method is a method to assign a role to a submeter in a fixed manner when the submeter is introduced. For example, when a submeter directly manages energy information on a generator, this submeter is assigned a role of a submeter which is compliant with electric power generation (an electric power generation-compliant-submeter) in a fixed manner at the introduction.

The association using the physical and logical configurations as the latter method is a method to assign a role after the introduction in a dynamic manner. For example, when a submeter directly manages a plurality of kinds of energy information on generation and storage of electric power, this submeter is assigned both roles of an electric power generation-compliant-submeter and a submeter which is compliant with electric power storage (an electric power storage-compliant-submeter) in a dynamic manner. In this case, it is possible to exchange configuration information of roles (information for each role such as a power consumption compliant-submeter, power generation compliant-submeter, and power storage compliant-submeter) among a plurality of submeters to perform energy management as a virtual aggregate in a system. This has an effect of reducing loads on engineering in management, adjustment, and investment.

Figure 5:
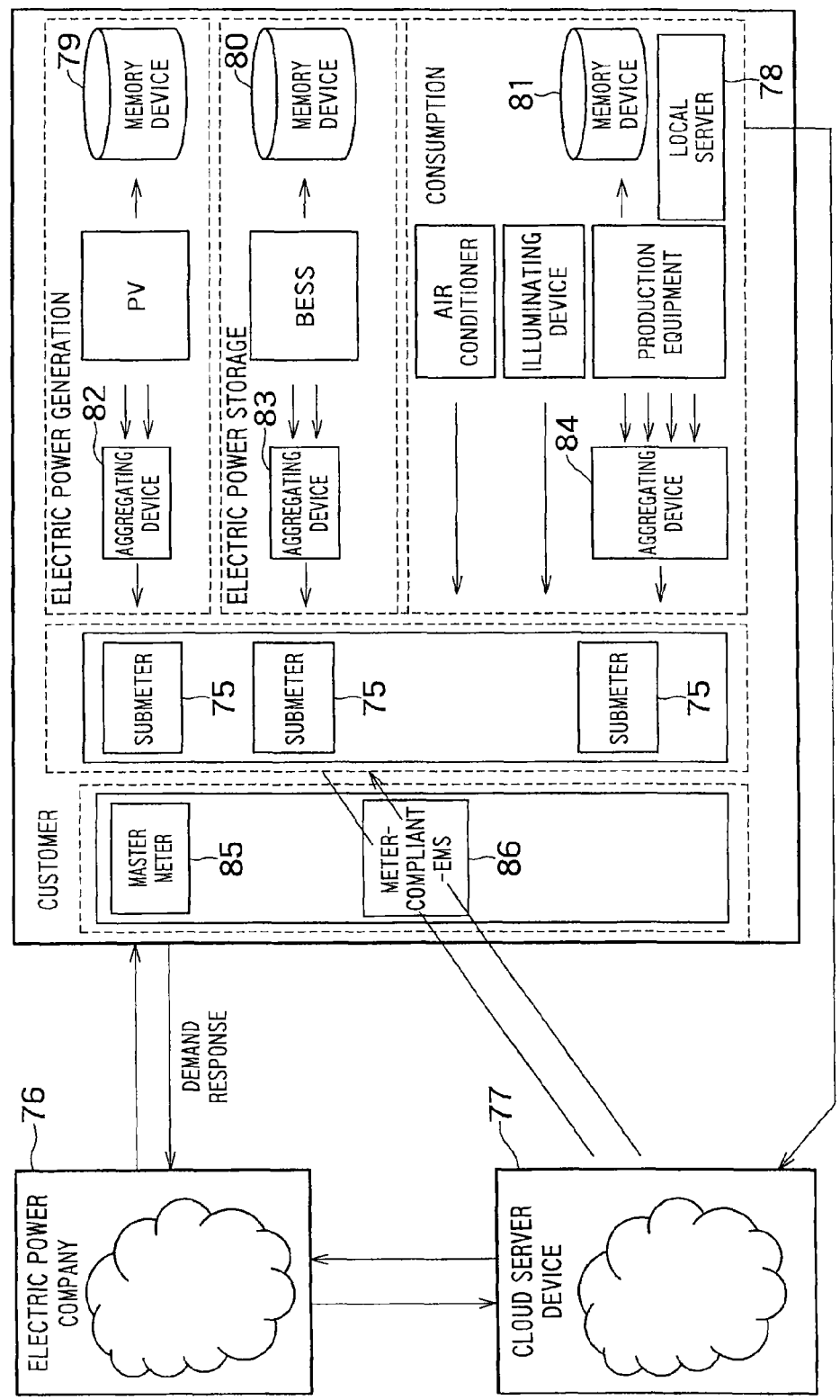
FIG. 5 is a diagram illustrating seamless management from a public service company to a customer from the viewpoint of the energy management device according to embodiment of the present invention.

FIG. 5 shows the entire system configuration relating to seamless management from a superordinate system to a subordinate system through submeters 75. An example here is illustrated centering on accommodating facilities such as buildings and factories in industry (commerce and manufacture) customer. It is needless to say that the embodiment of the present invention is not limited to particular applications, and is widely applicable.

As described above, a conventional practice is to collect energy information in units of equipment of the public service company or in units of facilities of the customer, to display the analysis result on a management terminal of the customer, and the like. As to the customer, main objects of the collection are devices that consume electric power. In the embodiment of the present invention, devices that consume, generate, or accumulate electric power are disposed inside the customer, and these devices are accommodated in a submeter for each role. This enables minute energy management of the operation and running status of the PV/BESS.

FIG. 5 illustrates three kinds of facilities. The three kinds of facilities includes, in addition to the facilities of the customer described in FIG. 4, a facility 76 of a public service company including an electric power company, and a facility (server device) 77 of a cloud company, which provides a suite of services to the public service company and the customer.

Conceivable services of the cloud company include, for example, proxy service for demand response, and equipment management and adjustment roles such as consumption, generation, and storage of electric power. The demand response includes a conventional demand response in units of facilities, as well as minute demand response. The cloud company in FIG. 5 does not have to separately exist, but may be incorporated as a function of the public service company or as function of the customer, as appropriate according to the circumstances of countries or regions. The server device 77 on a cloud company side, as will be described hereafter, may be directly connected to the submeter 75 of the customer to perform control, or may perform control through a master meter 85 the owner of which is the company side (public company or cloud company). The server device 77 can control the power electronics devices of the customer through the submeters, as well as control the power electronics devices through a meter-compliant-EMS 86.

Here, as described above, there are various kinds of energy relating to the devices in the facility of the customer. The public service company (electric power company in FIG. 5) or the cloud company as a superordinate does not have to manage all of them. Thus, in the case of electric power company management for example, it is preferable that energy information relating to electric power is transmitted to the superordinate, and energy information relating little to electric power (e.g., operating information on production equipment) is stored and processed in a local server 78. The acquired energy information (information on electric power or other energies) may be stored in, for example, memory devices 79, 80, and 81 for generation, storage, and consumption of electric power. The storage capacities of the memory devices 79, 80, and 81 may be saved as needed by compressing data, such as thinning out data to be stored in memory devices 79, 80, and 81 by sampling, and storing values subjected to statistical processing including averaging. The energy information relating little to electric power that is stored and processed in local server 78 may be transmitted the server device 77 of the cloud company as needed. The cloud company may perform demand response also using information from the local server 78.

In addition, the various pieces of energy information including consumption, generation, and storage of electric power have different features on amounts or frequencies of generated data. For example, information on the power consumption of an air conditioner is typically in minutes or seconds, whereas flow rate information on production equipment may be typically in milliseconds or seconds. For this reason, taking processing loads on existing facilities, and processing loads on the submeters into consideration, aggregating devices 82, 83, and 84 may be installed between the submeter and the devices (e.g., PV and BESS). Alternatively, the devices may have a function equivalent to the aggregating devices. It is preferable that the aggregating devices 82, 83, and 84 thin out the data by sampling or calculate the average values and transmit the data to the superordinate, so as to suppress the amount of communications or controls propagating across the entire system. The number of headed lines drawn out from the power electronics devices in FIG. 5 expresses the image of the amount of data, and a greater number of the headed lines means a larger amount of data.

In addition, FIG. 5 shows the relationship between the public service company and the customer, and this scheme can apply to the interchange of energy between the customers. For example, in the case of a manufacturing field, the status of operation and running and the configuration of consumption, generation, and storage of electric power differ according to factories. Introducing the submeters 75 enables developing minute exchange of incentives between the customers. In addition, it is possible to maximize energy conversion efficiency or to minimize energy loss for each region under a substation.

Figure 6:
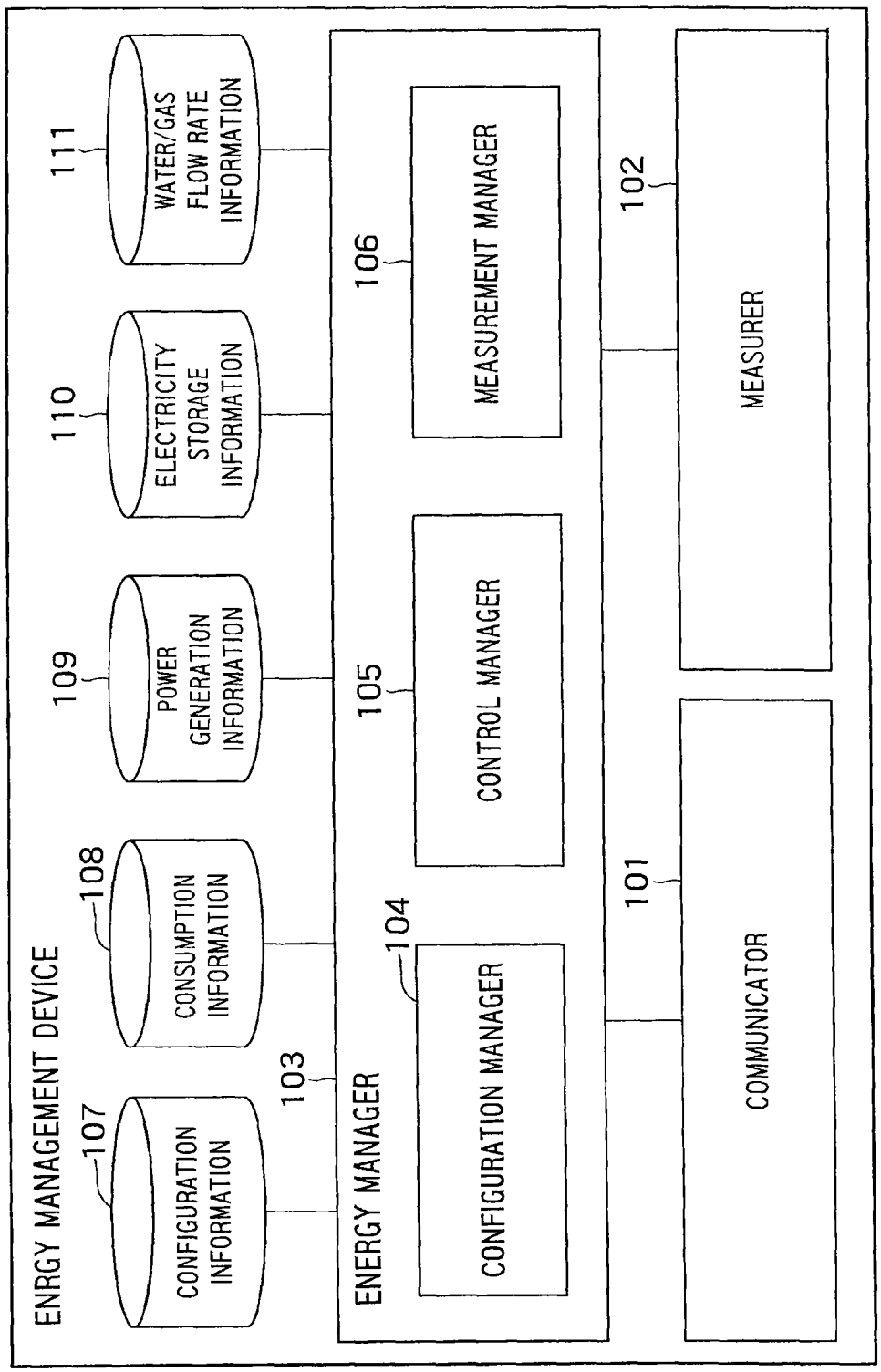
FIG. 6 is a block diagram of the energy management device according to the embodiment of the present invention.

FIG. 6 shows the configuration of an energy management device according to the embodiment of the present invention. The energy management device can be installed in a smart meter such as a master meter and a submeter, a local controller, and a power electronics device (e.g., in a PCS). Alternatively, the energy management device can be installed in an EMS on the system side that controls a local controller, a smart meter, or the like from a superordinate, or in a server device that performs reverse power flow management or demand management on a system side (e.g., the server device on the cloud side in FIG. 5). The energy management device of the present embodiment can be not only installed in devices of one kind described here, but also installed in devices of a plurality of kinds to cooperate with one another. All components of the configuration shown in FIG. 6 are not necessarily included according to destinations to install the energy management device, and a part of blocks or a portion in a block in FIG. 6 may be omitted.

The energy management device includes a communicator 101, a measurer 102, an energy manager 103, and various storages. The energy manager 103 includes a configuration manager 104, a control manager 105, and a measurement manager 106. The various storages are a configuration information storage 107, a consumption information storage 108, a power generation information storage 109, an electricity storage information storage 110, and a water/gas flow rate information storage 111.

The communicator 101 performs wired or wireless communication with other devices. Physical communication media include wired communication media such as an optical fiber, a private line, an Ethernet. Wireless communication media includes a 2.4 Ghz/5 GHz wireless LAN and 920 MHz radio. A conceivable form is to implement a communication medium by a CAN, RS-232/RS-485, or the like. The communicator 101 performs wired or wireless communication on these communication media, under various standard protocol interface schemes.

The measurer 102 measures the physical quantities of a measurement object. For example, this applies to a case where these energy management devices are installed in the submeters shown in FIG. 2 or FIG. 5 to measure the physical quantities of a generator, an electric accumulator, and an electric power consuming device, or a case where the energy management device is installed in the power electronics device itself. With respect to physical quantities relating to power (e.g., power consumption, electric energy consumption, generated electric power, generated electric energy, accumulated electric power, and accumulated electric energy), pieces of information on a power (W), an electric energy (Wh), a voltage (V), a frequency (f), and the like are measured. Measurement objects include PVs, BESSs, and electric power consuming devices as well as the amount of energy flow of other than power (e.g., water and gas). It is noted that providing an energy management device in the form of a local controller allows the communicator 101 of the local controller to acquire measurement information directly from a power electronics device. For example, in the case of BESS, the communicator 101 of a local controller can acquire the SOC or SOH of an energy storage. In an example of FIG. 7 to be described hereafter, a submeter can measure the physical quantities relating to consumption, generation, and storage of electric power of a power electronics device directly connected to a power line to which the submeter is connected.

Figure 7:
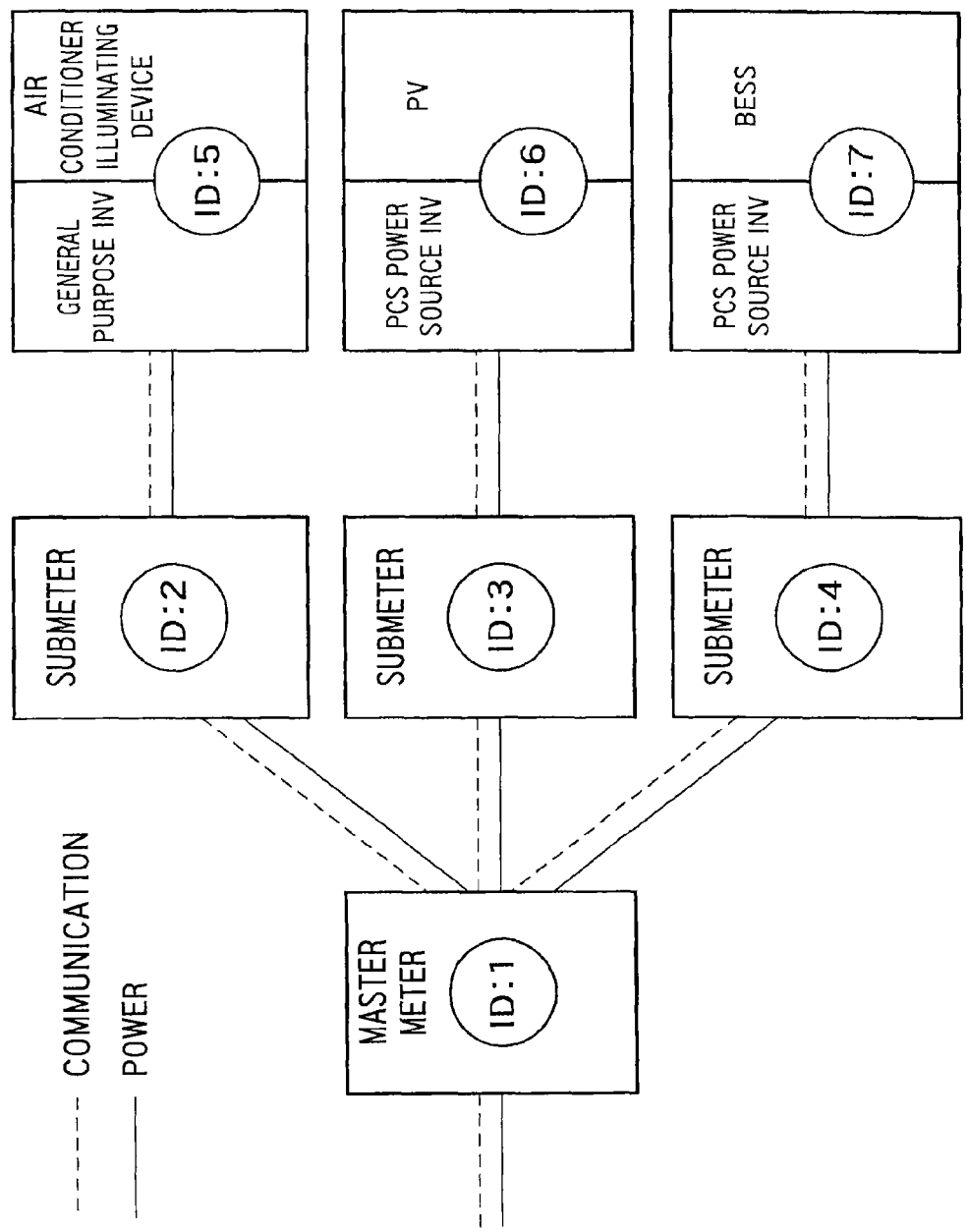
FIG. 7 is a diagram showing an example of configuration information in the energy management device according to the embodiment of the present invention.

The configuration information storage 107 stores configuration information. FIG. 8 shows a specific example of configuration information to be stored in the configuration information storage 107. FIG. 7 shows an example of the connection configuration of devices, on which the configuration information in FIG. 8 is premised. FIG. 7 shows an example of the connection configuration in which the energy relates to electric power, but the present embodiment is not limited to this.

As shown in FIG. 7, each device has an identifier (ID) assigned thereto. In the case where the energy relates to electric power, the devices (master meter, submeters, and power electronics devices) are connected to one another on a communication line and a power line. The illustrated example shows a case where a submeter accommodates a terminal power electronics device in a one-to-one manner. Note that it is possible to have a configuration in which one submeter accommodates a plurality of power electronics devices separately, or a configuration in which one submeter accommodates a plurality of power electronics devices as a whole through a common power line (bus) (in this case, measuring the total physical quantity of the plurality of power electronics devices and acquiring pieces of measurement information on the individual power electronics devices through communication are possible). Although the devices here are connected by both the communication line and the power line, the connection of the power line may differ from the connection of the communication. In addition, it is possible to have a case where groups of submeters being subordinates of a master meter have a hierarchical configuration of two levels or more. For example, it is possible to have a configuration in which a plurality of submeters are connected as the subordinates of one submeter. The illustrated example assumes a case where that only the master meter can communicate with superordinates on the system side, but a submeter may communicate directly with the superordinates on the system side. In this case, the master meter may function as a relay to relay the communication, or it is conceivable to perform the communication not through master meter.

As shown in FIG. 8, the configuration information contains the role of a device, information on connection among devices, device information, and owner information for each identifier (ID) assigned to each device. Possible methods of setting these identifiers or various information include manual setting by an operator (e.g., manual inputting and firmware updating), as well as dynamic updating using communication. To automatically detect connections in terms of electric power among devices connected to the same power line, for example, one device applies an electric signal to the power line and the other devices detect this, which enables the confirmation of the connection in terms of electric power. To automatically detect connections in terms of communication, for example, a device broadcasts a search signal and devices that have successfully received the search signal return response signals, which enables the confirmation. The methods of automatically detecting the connections in terms of electric power and in terms of communication described here are merely examples, and other various methods can be used. The connection information in terms of electric power and in terms of communication that are automatically confirmed in such a manner, and the above-described device information, role information, and IDs, are notified to the other devices through communication, the device that receives these pieces of information notifies them to yet another device, and similar information is received from yet another device. The same configuration information may be thereby shared among the devices. The configuration information in FIG. 8 is stored in, for example, the master meter and the submeters in FIG. 7. Furthermore, the configuration information may be stored in the power electronics devices. In addition, if there is a local controller that controls the power electronics devices or the submeters, or both of them, the local controller may have the same configuration information stored therein.

The device information is optional and fixed information on devices related to consumption, generation, and electric power storage. For example, the device information is rating information on a terminal power electronics device. The device information is expressed in, for example, electric power (W), electric energy (Wh), voltage (V), or frequency (f). In addition, the device information can take the form of a state of charge (SOC) or a state of health (SOH). The role expresses the type of a device such as a master meter, a submeter, an electric power consuming device, a generator, and an electric accumulator. The owner information expresses an owner who owns the device. For example, a public service company may own a master meter, and the customer may own a submeter and a power electronics device. In the illustrated example, the submeters and the power electronics devices are owned by the same owner, but may be owned by different owners. For example, the submeters are owned by the owner or developer of the facility, and the power electronics devices are owned by the customer. There may be naturally a case other than those described here. Here, the owner of the energy management devices according to the present embodiment may be considered to be identical to the owner of a device in which this energy management device is installed. Now, FIG. 8 shows an example in which the owner information is contained in the configuration information, but may not by contained in the configuration information. The owner may be uniquely identified from a role.

The consumption information storage 108 stores consumption information. The power generation information storage 109 stores power generation information. The electricity storage information storage 110 stores electricity storage information. The water/gas flow rate information storage 111 stores water/gas flow rate information. The consumption information, power generation information, electricity storage information, and water/gas flow rate information are real time information that is measured by the measurer 102 and measurement information on the other measurement objects that is received via the communicator 101.

The consumption information contains, for example, the power consumption, electric energy consumption, and the cumulative value of electric energy consumption of each electric power consuming device, or the total electric energy consumption of the electric power consuming devices, of each given period of time. Furthermore, these pieces of information may be associated with measurement time information. All of these are examples of energy information based on the measurement of the physical quantities (e.g., power consumption and electric energy consumption). In the case of a master meter, the energy information may be stored for each subordinate submeter. In the case of a submeter that has a plurality of submeters in its subordinate, the energy information may be stored for each of the subordinate submeters, or the total values or the like of the pieces of energy information may be stored. In addition, when the subordinate of a submeter includes a plurality of power electronics devices connected to a common power line, the power consumption, the electric energy consumption, or the like of these power electronics devices may be stored as a whole. Statistics such as an average and variance of the electric energy consumptions of the power electronics devices may be stored. If the energy management device can communicate with the power electronics devices, the information on the power consumptions or electric energy consumptions may be acquired from the power electronics devices through communication.

The power generation information contains, for example, the generated electric power and generated electric energy, and the cumulative value of the generated electric energy of each generator, or the total generated electric energy of the generators, of each given period of time. Furthermore, these pieces of information may be associated with measurement time information. All of these are examples of energy information based on the measurement of the physical quantities (e.g., generated electric power and generated electric energy). In the case of a master meter, the energy information may be stored for each subordinate submeter. In the case of a submeter that has a plurality of submeters in its subordinate, the energy information may be stored for each of the subordinate submeters, or the total values or the like of the pieces of energy information may be stored. In addition, when the subordinate of a submeter includes a plurality of power electronics devices connected to a common power line, the generated electric power, the generated electric energy, or the like of these power electronics devices may be stored as a whole.

Statistics such as an average and variance of the generated electric energies of the devices may be stored. If the energy management device can communicate with the power electronics devices, the information on the generated electric powers or generated electric energies may be acquired from the power electronics devices through communication.

The electricity storage information contains, for example, the accumulated electric power and accumulated electric energy, and the cumulative value of the accumulated electric energy of each electric accumulator, or the total accumulated electric energy of these electric accumulators, of each given period of time. Furthermore, these pieces of information may be associated with measurement time information. All of these are examples of energy information based on the measurement of the physical quantities (e.g., accumulated electric power and accumulated electric energy). In the case of a master meter, the energy information may be stored for each subordinate submeter. In the case of a submeter that has a plurality of submeters in its subordinate, the energy information may be stored for each of the subordinate submeters, or the total values or the like of the pieces of energy information may be stored. In addition, when the subordinate of a submeter includes a plurality of power electronics devices connected to a common power line, the accumulated electric power, the accumulated electric energy, or the like of these power electronics devices may be stored as a whole. Statistics such as an average and variance of the accumulated electric energies of the power electronics devices may be stored. If the energy management device can communicate with the power electronics devices, the information on the accumulated electric powers or accumulated electric energies may by acquired from the power electronics devices through communication.

The water/gas flow rate information contains, for example, a flow rate of each electric accumulator, the total of the flow rates, or the like, of each given period of time. Furthermore, these pieces of information may be associated with measurement time information. All of these are examples of energy information based on the measurement of the physical quantities (flow rates of water and gas). In the case of a master meter, the energy information may be stored for each subordinate submeter. In the case of a submeter that has a plurality of submeters in its subordinate, the energy information may be stored for each of the subordinate submeters, or the total values or the like of the pieces of energy information may be stored.

The measurement manager 106 manages energy information based on measurement information on the energy management device of itself or measurement information on the other energy management devices. The measurement manager 106 manages the energy information, for each energy type, based on physical quantities measured from measurement objects related to the energy type. The energy types contain, for example, categories of at least electric power and energies other than the electric power. An example of further detailed the energy types contain categories of at least electric power, water, and gas (refer to FIG. 4). Alternatively, the energy types have further detailed power categories of at least power consumption, electric power storage, and electric power generation (refer to FIG. 4).

The measurement manager 106 updates the content of a corresponding storage according to the energy types, based on measurement information measured by the measurer 102.

For example, in the case where the measurer 102 measures the physical quantities of a generator, the power generation information storage 109 is updated based on the measurement information. For example, the measurement information is stored in the power generation information storage 109, or the cumulative value of the amount of power generation stored in the power generation information storage 109 is updated. Alternatively, statistics such as an average value are updated. In such a manner, the energy information on electric power generation is update and managed.

In addition, the measurement manager 106 acquires energy information such as consumption information, power generation information, electricity storage information, and water/gas flow rate information from the other energy management devices via the communicator 101, and updates the content of each storage based on the acquired energy information. Alternatively, the measurement manager 106 may receive measurement information on measured physical quantities of a measurement object from the other device that measures the physical quantities, identify the energy type, and update the information in the corresponding storage.

The measurement manager 106 can determine devices to be acquisition sources of the energy information by optional criteria. For example, the energy information may be acquired from all the devices that can communicate therewith based on the configuration information in FIG. 8. Alternatively, the acquisition sources may be determined using owner information. For example, when the device itself is owned by a first owner, a device owned by a second owner may be determined to be the acquisition source. At this point, the acquisition sources may be determined from among only devices having a specific role (device type) (e.g., submeter).

Alternatively, the measurement manager 106 may transmit the energy information such as consumption information, power generation information, electricity storage information, and water/gas flow rate information held by the device itself to the other devices. For example, the energy information may be transmitted to all the devices that can communicate therewith based on the configuration information in FIG. 8. Alternatively, transmission destinations may be determined using owner information. For example, when the device itself is owned by the second owner, a device owned by the first owner may be determined to be the transmission destination. At this point, the transmission destinations may be determined from among only devices having a specific role (device type) (e.g., master meters, local controllers, submeters in its superordinate). Alternatively, required information may be transmitted only when a transmission request is received from the other device.

When the amounts of information (energy information) in the consumption information storage 108, power generation information storage 109, electricity storage information storage 110, and water/gas flow rate information storage 111 become large, the energy management device may keep the information in a memory device separately connected to the energy management device.

In addition, the information (energy information) in the consumption information storage 108, power generation information storage 109, electricity storage information storage 110, and water/gas flow rate information storage 111 may be, for example, brought together and stored in one storage medium, or divided and stored in a plurality of storage media, which is independent of a particular form of storing.

The configuration manager 104 of the energy manager 103 manages the relationship among devices (EMS, master meter, submeter, power consuming device, electric generator, and electric accumulator) in the communication network and the electricity network based on the configuration information.

The configuration manager 104 creates, for example, configuration information based on setting input by an operator. When the configuration information is automatically created by this device rather than the presetting by an operator, the configuration manager 104 creates and updates the configuration information using the application or detection of an electric signal, via the communicator 101 and a connector (not shown) to the power line. The configuration manager 104 may be configured to transmit and receive the configuration information with devices that can communicate the configuration information therewith and update the configuration information to cause the configuration information to represent the entire facility.

In addition, the configuration manager 104 may grasp hierarchical configuration of the meters using the configuration information.

For example, the hierarchical configuration in terms of electric power or in terms of communication may be grasped in such a manner as to consider a master meter as the top, a submeter connected directly to the master meter in terms of electric power or in terms of communication as a first rank submeter, and a submeter that is not connected to the master meter but to the first rank submeter as a second rank submeter. A route along which the energy information is transmitted to the measurement manager 106 may be considered as the hierarchical configuration from the subordinate to the superordinate.

The control manager 105 manages controls relating to power consumption, electric power generation, and electric power storage. For example, the control manager 105 performs demand management on the increase/decrease of electric power and electric energy, which relate to energy supply and demand, and performs the reverse power flow management on voltage and frequency, which relate to the stability of energy.

For example, the control manager 105 controls, as described above, the electric energy of power that an electric accumulator or a generator outputs to the power line (power sharing control) or the phase thereof (power source phase control). As an example of the power sharing control, the control manager 105 determines an electric energy that the electric accumulator or the generator outputs to the power line and instructs the devices so as to supply the total electric energy requested from a superordinate system. At this point, the control manager 105 may control active power and reactive power by synchronizing the phases of the output powers. Alternatively, instruction information is divided into pieces and sent to subordinate energy management devices. For example, when the device itself (e.g., master meter or local controller) is found to be owned by the first owner based on the owner information, the pieces of instruction information are sent to the energy management devices (e.g., submeters) of the second owner. The energy management devices of the second owner instruct electric accumulators or generators in response to the pieces of instruction information, or if these energy management devices further include energy management devices of the second owner in their subordinates, instruction information is divided and sent to the devices.

In addition, if the connection with the superordinate system is disconnected (blackout), the control manager 105 determines the power to be output from the electric accumulator or the generator and instructs the devices on the determination in order to continue the operations of electric power consuming devices or production equipment with the devices in the facility. Alternatively, instruction information is divided into pieces and sent to subordinate energy management devices. For example, when the device itself (e.g., master meter or local controller) is found to be owned by the first owner based on the owner information, the pieces of instruction information are sent to the energy management devices (e.g., submeters) of the second owner. The energy management devices of the second owner instruct electric accumulators or generators in response to the pieces of instruction information, or if these energy management devices further include energy management devices of the second owners in their subordinates, instruction information is divided and sent to the devices.

In addition, the control manager 105 may controls the voltages and frequencies of outputs from the devices at prescribed values or within prescribed ranges, for reverse power flow management of the system.

The control manager 105 may perform the controls upon receiving the instruction information from an EMS on the system side, may perform the controls upon receiving the instruction information from a local controller, or may perform the controls upon receiving the instruction information from a master meter (as described above, the energy management device according to the embodiment of the present invention can be installed in any one of the master meter, submeter, and power electronics device in FIG. 7).

The controls described here is merely exemplary, and the control manager 105 can perform various controls on consumption, generation, and storage of electric power, and the like as will in the facility.

In the case where the electric power company being a superordinate system manages a master meter, the master meter itself have no direct connection relationship with terminal power electronics devices on the power line, as shown in FIG. 7, but can function as a virtual measuring device by bringing together and manages information on a plurality of submeters.

As described above, the energy management device may be installed in a server device on a cloud side or the like. In this case, the server device may be owned by a public service company or a company to which the public service company outsources the provision of services including demand management. The outsourced company may be considered to be the same company (first owner) as a company on the public service company side, from the customer side.

Information on the server device (e.g., ID, role, and owner) may be contained in the configuration information of the configuration manager of the energy management device.

In addition, the configuration information may contain information on whether or not the server device can be directly connected to or can instruct the energy management device of the other owner (second owner) in the facility. The server device acquires energy information from, for example, a master meter or a local controller to manage the energy information, in the facility of the customer for each energy type. At this point, the individual terminal devices in the facility do not need to be distinguished, and the power consumptions and electric energy consumptions, the generated electric powers and generated electric energies, and the accumulated electric powers and accumulated electric energies in the facility may be managed as a whole. These values may be manages in any form such as instantaneous values, cumulative values, and statistics.

If the server device is enabled to be directly connected to devices of the second owner, the server device may collect the energy information from the directly connectable devices (e.g., submeters), or if unable to be directly connected, the server device may collect the energy information from an energy management device (master meter) of the same owner (first owner).

The server device may perform demand management in the facility to cause required surplus power to be output to the system, to cause surplus power to be sent from the system side and stored in an energy storage, or to control of the operation and shutdown of a generator. At the time of the control, if the server device can be directly connected to devices of the second owner, the server device may transmit instruction information individually to the directly connectable devices (e.g., submeters) to individually control the devices, or if unable to be directly connected, the server device may transmit the instruction information to an energy management device (master meter) of the same owner (first owner), and perform controls via the master meter. At this point, the content of the instruction information to be sent to the master meter may be determined in accordance with the granularity of the above-described energy information collected via the master meter. If the information can be collected for each submeter, the instruction information on each submeter may be transmitted to the master meter, or if only information on the total of the these pieces of information can be collected, a request may be transmitted as a whole to the master meter, and the master meter may break down the contents of the request, and determine and transmit the instruction information on individual submeters.

Figure 9:
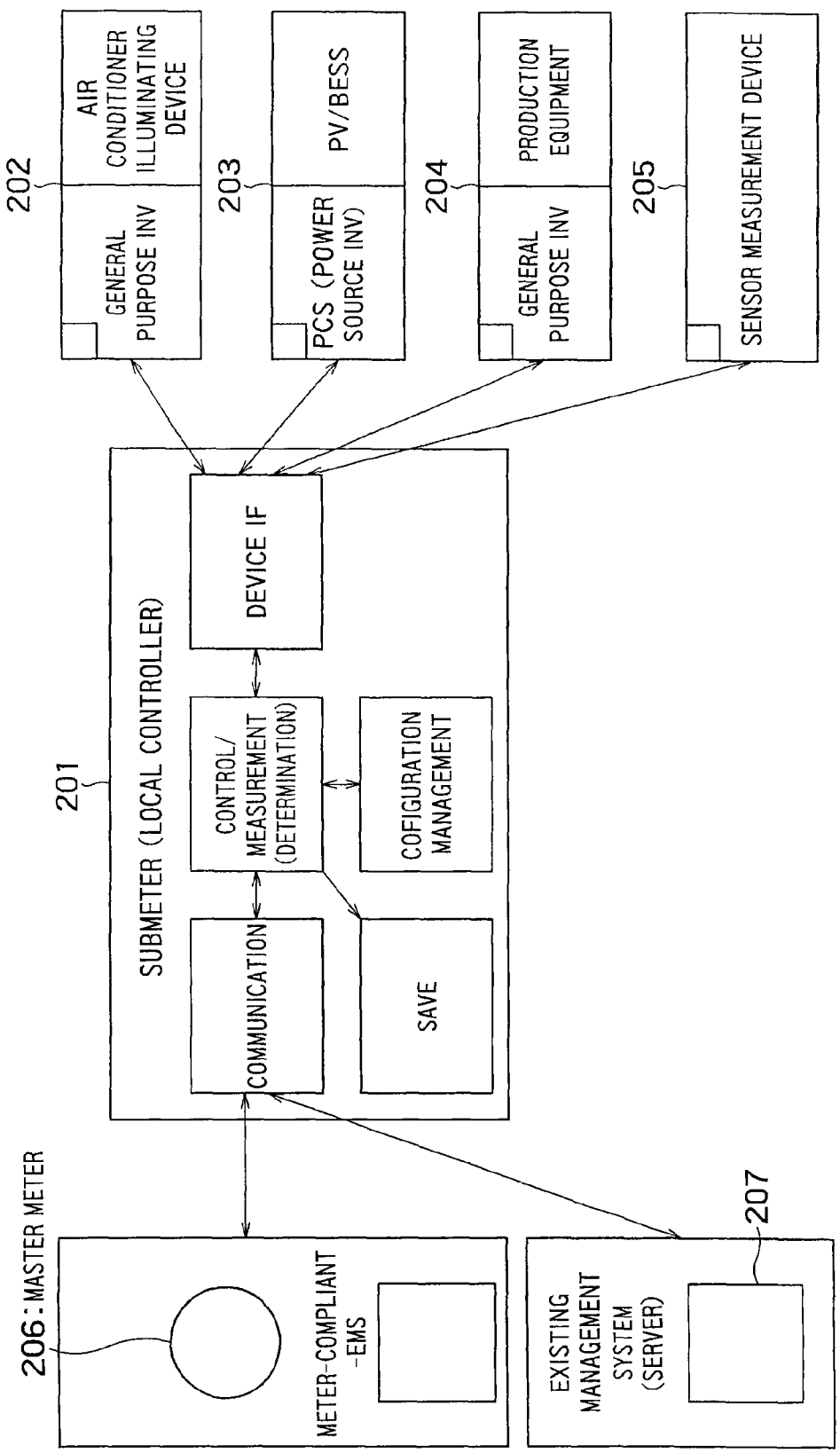
FIG. 9 is a diagram showing an application form of the energy management device according to embodiment of the present invention.

FIG. 9 shows an example of the application form of the energy management device according to embodiment of the present invention. As shown in FIG. 9, methods of implementing an energy management device 201 include one in the form of a device being a submeter, as well as one in the form of a local controller that is connected to a master meter 206, various power electronics devices 202, 203, and 204, and a sensor/measuring device 205. The energy management device can be built in the various power electronics devices and the sensor/measuring device, as an adapter (controller). Practicing the present invention does not depend on a particular form, and can be implemented by combining forms as appropriate. In the implementation, an important thing is to fit the functions of this energy management device to the adopted method and specification of the master meter, and to make an existing management system (server) 207 and the various devices (e.g., power electronics devices and sensor/measuring device) to conform and support the specification.

Figure 10:
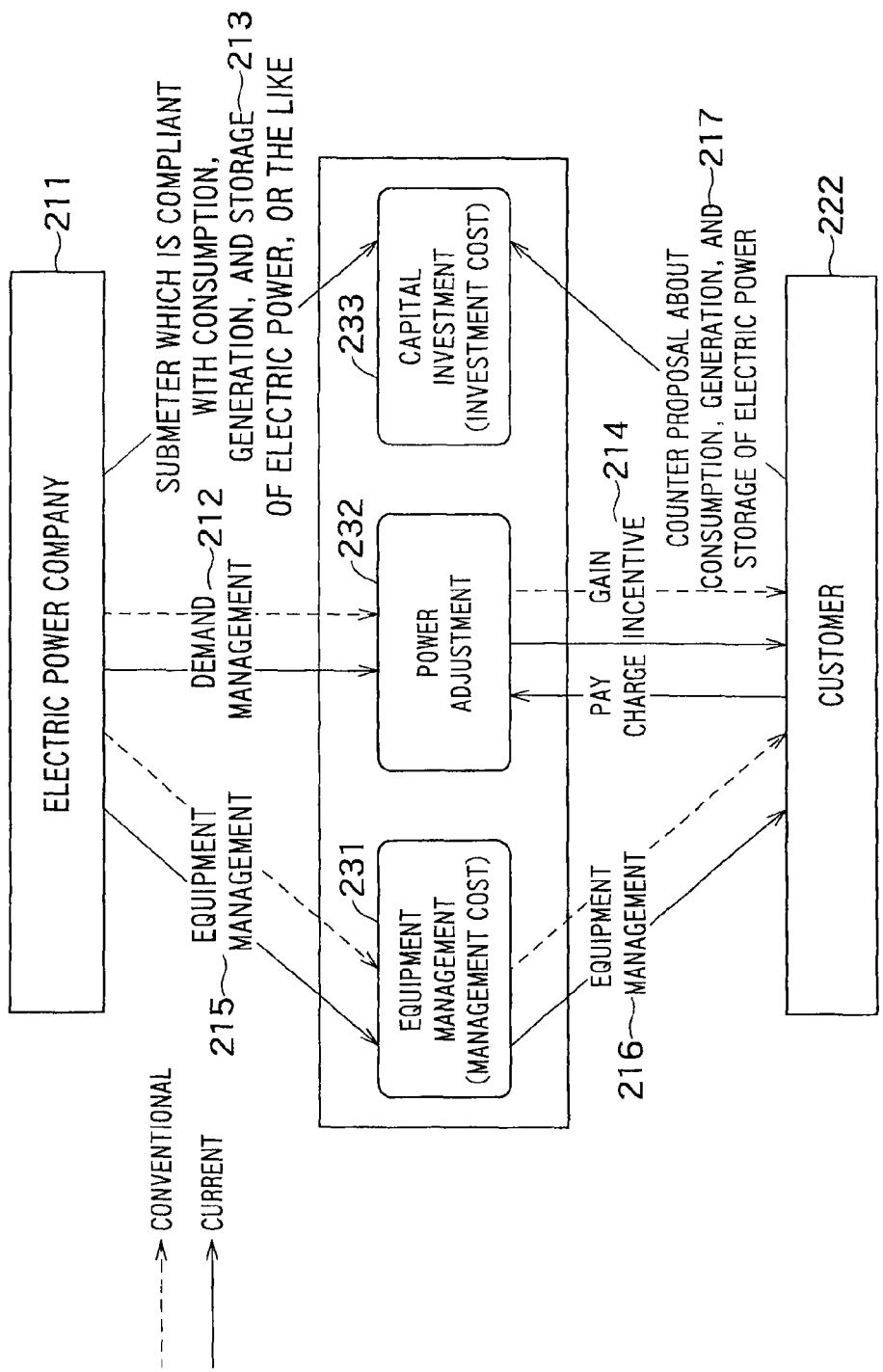
FIG. 10 is a diagram illustrating the effects of the embodiment of the present invention.
Figure 11:
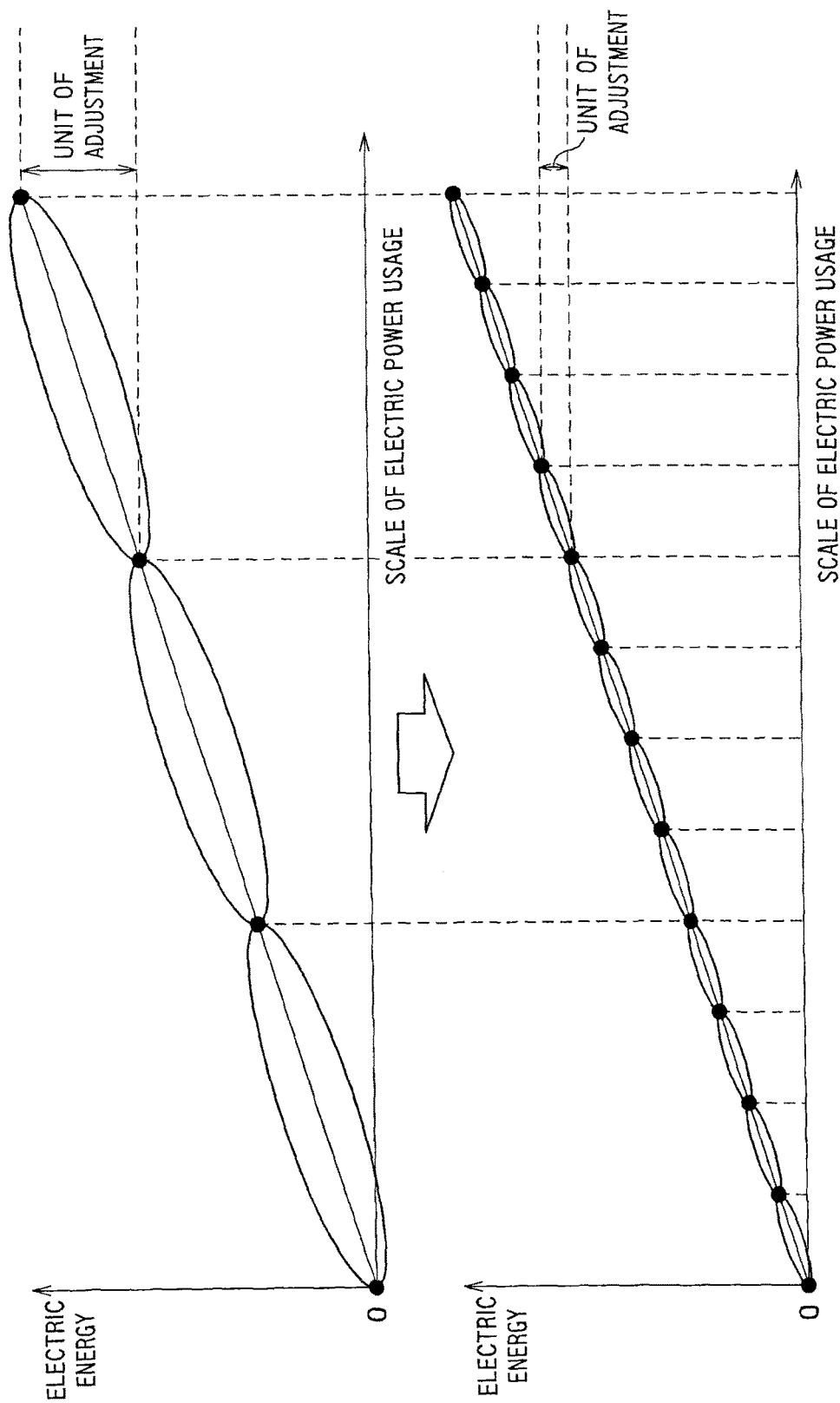
FIG. 11 is a diagram illustrating the effects of the embodiment of the present invention.

FIG. 10 and FIG. 11 are diagrams showing the effects of the embodiment of the present invention. The effects of the embodiment of the present invention are seen from the viewpoint of a public service company 211 such as an electric power company, and from the viewpoint of a customer 222. In addition, the effects are considered from three viewpoints of equipment management (management cost) 231, power adjustment 232, and capital investment (investment cost) 233.

From the viewpoint of the public service company (e.g., an electric power company here) 211, it is necessary to take demand management (peak cut/peak shaving) 212, reverse power flow management, and the like into consideration in order to stabilize electric power supply. Adapting submeter(s) which are compatible with consumption, electric power generation, and electric power storage (capital investment) 213 allows for minute demand response menus, which enables highly accurate power and equipment management 215 and 216.

That is, margin-less (having a fine adjustment unit) power and equipment management enables a fine unit for contract and management (unit of adjustment) shown in FIG. 11, which means that an adjustment focusing a particular field can be achieved. The top portion of FIG. 11 shows the image of an adjustment range through a master meter, and the bottom portion of FIG. 11 shows the image of an adjustment range through a submeter.

In contrast, from the viewpoints of a customer such as industry (commerce and manufacture), increased accuracy of estimates allows for additional reception of monetary incentives 214 from the public service company that reduces unnecessary margins (estimation errors). In addition, the reliability in cooperation with the electric power system is increased in terms of the roles of consumption, generation, and storage of electric power, which provides benefits in the form of a counter proposal 215 to the electric power company, in terms of capital investment. That is, a viewpoint of a counter proposal from the customer, and investment in consumption as well as generation and storage of electric power, and investment in stabilizing the electric power system are enabled. As a result, the optimization of the whole energy infrastructure system can be achieved.

These elements described in the embodiment of the present invention can apply to not only a case where the public service company accommodates individual customers, but also, for example, aggregated virtualization in which a plurality of customers are aggregated and managed.

Figure 12:
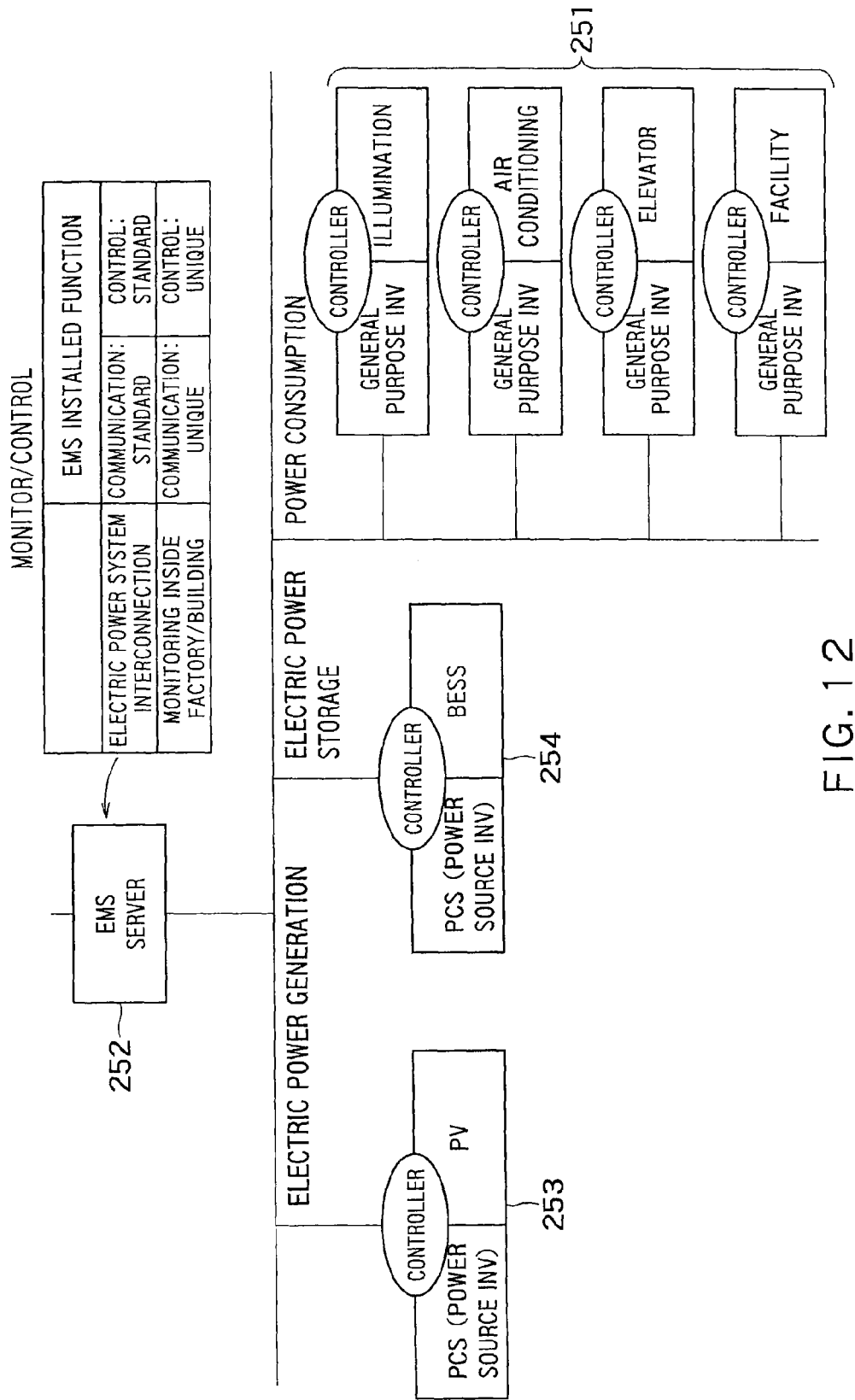
FIG. 12 is a diagram showing a trend in an energy infrastructure in an industrial field, in the embodiment of the present invention.
Figure 13:
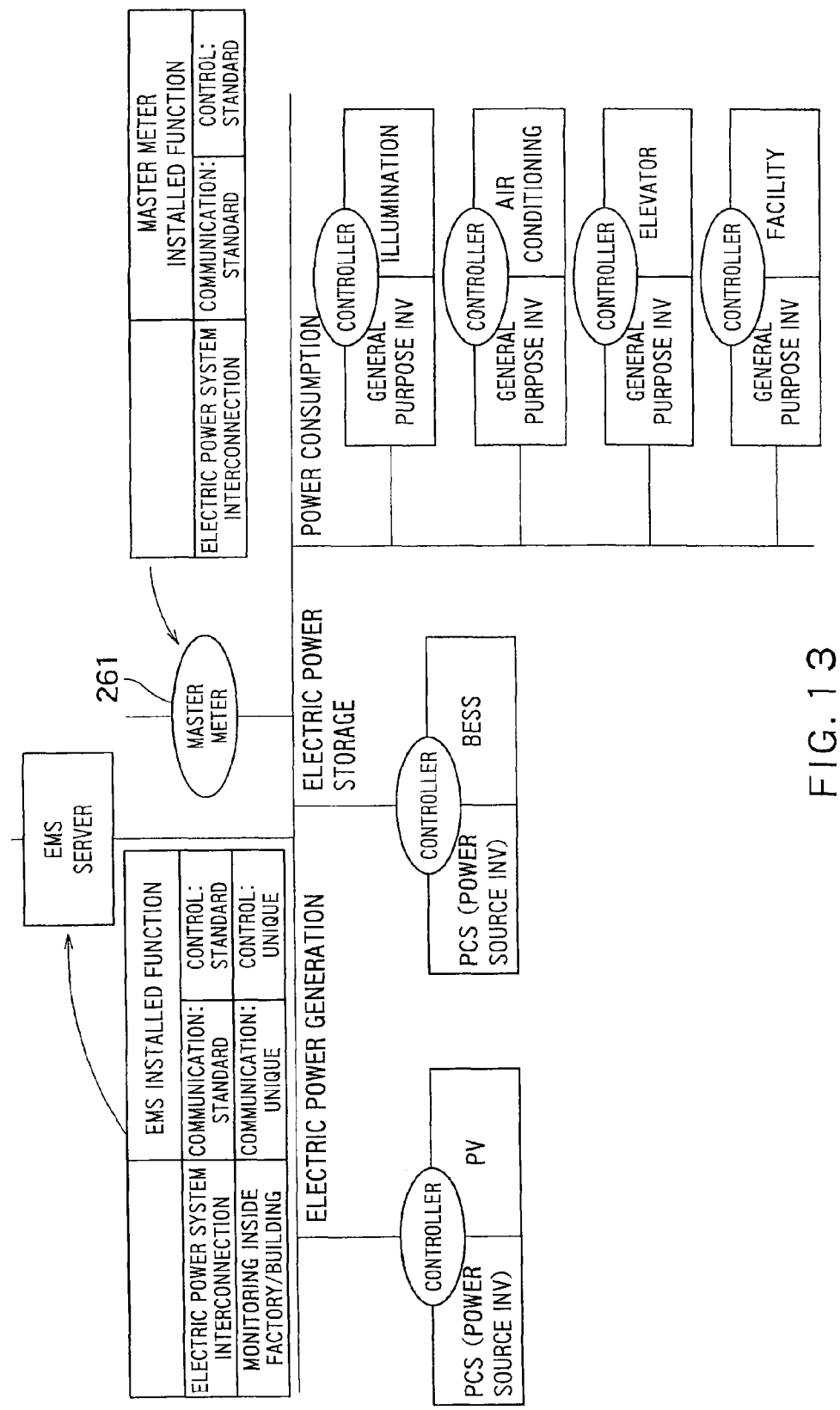
FIG. 13 is a diagram showing the trend in the energy infrastructure in the industrial field, in the embodiment of the present invention.
Figure 14:
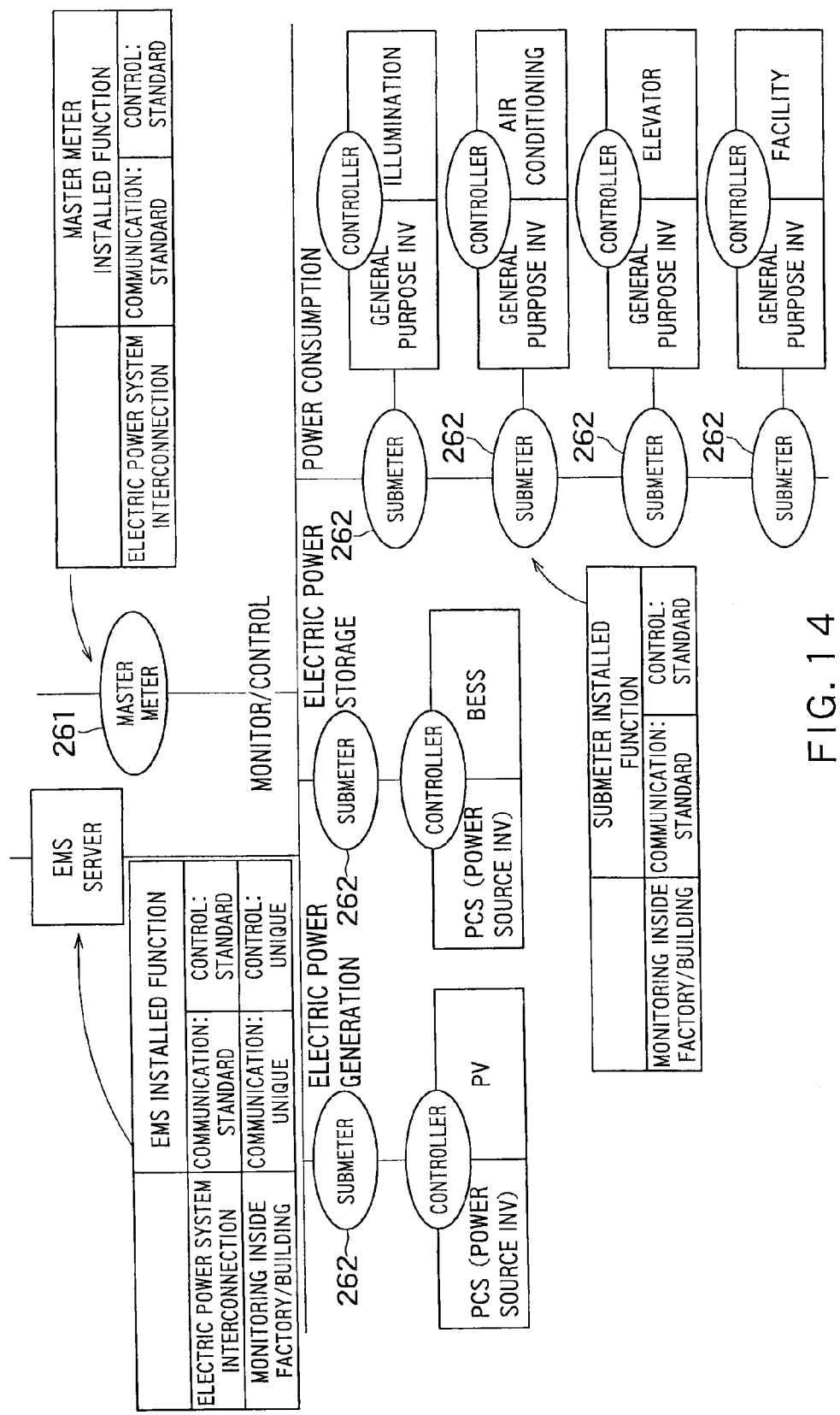
FIG. 14 is a diagram showing the trend in the energy infrastructure in the industrial field, in the embodiment of the present invention.

FIG. 12, FIG. 13, and FIG. 14 present the step-ups of a system due to the introduction of the energy management device of the embodiment of the present invention, and the advent of a master meter and submeters.

Typical solutions for industry (commerce and manufacture) have been configured by, as shown in FIG. 12, three step-ups.

(1) The system is configured by electric power consuming apparatuses 251 (power consumption type), and peak cut by energy saving diagnosis and management is performed. A solution company encircles factories and buildings entirely, and sets up and runs a server 252 with a unique communication and control system.

(2) A new customer PV 253 appears and is added to the system (power consumption type+electric power generation type). Selling power by reverse power flow by energy creation is further added. An interactive exchange between the electric power company and the electric power user occurs. High FIT prices accelerate the introduction of PVs.

(3) A BESS 254 appears and is added to the system (power consumption type+electric power generation type+electric power storage type). Peak shaving by energy storage is further added. Power storage in the nighttime and the storage of generated electric power are performed.

In (1) to (3), the EMS (server) 252 has served both the cooperation in the electric power system and the like, and the monitoring of the factories and buildings. The server has conformed to the standard of communication and control in the cooperation with the electric power system, but has adopted unique specifications (controller) of communication and control in the factories and buildings.

In contrast, in a new industry solution, as a step (4) following the above-described three steps, a master meter 261 appears and is added to the system as shown in FIG. 13. The master meter is made intelligent, and part of the functions served by the EMS is installed in the master meter in terms of the cooperation with the electric power system. The master meter begins to play the role of the server.

Furthermore, as a step (5) following FIG. 13, as shown in FIG. 14, submeters 262 appear and are added to the system. The submeters 262 are made intelligent, and part of the functions served by the EMS is also installed in the submeters in terms of the monitoring of the buildings and factories. As a result, the advent of intelligent meters summarizes the solutions for factories and buildings, which have been practiced by solution companies with unique specifications, into a standard in conformity with the communication and control between master meter and the submeters. With the unique specifications, the modifications of communication and control are unavoidable. Controllers in conformity with the submeter specification begin to take the place of controllers having the unique specifications.

As a result of the step-ups in FIG. 12, FIG. 13, and FIG. 14, the increased accuracy (estimated value) of the control and measurement of energy such as electric power (generation, consumption, and storage of electric power), and gas and water allows the public service company and the customer to perform margin-less (having a fine adjustment unit) investment, adjustment, and management.

FIG. 15, FIG. 16, FIG. 17, and FIG. 18 show the communication procedure among devices in a facility of an industry (commerce and manufacture) customer, in the embodiment of the present invention.

Figure 15:
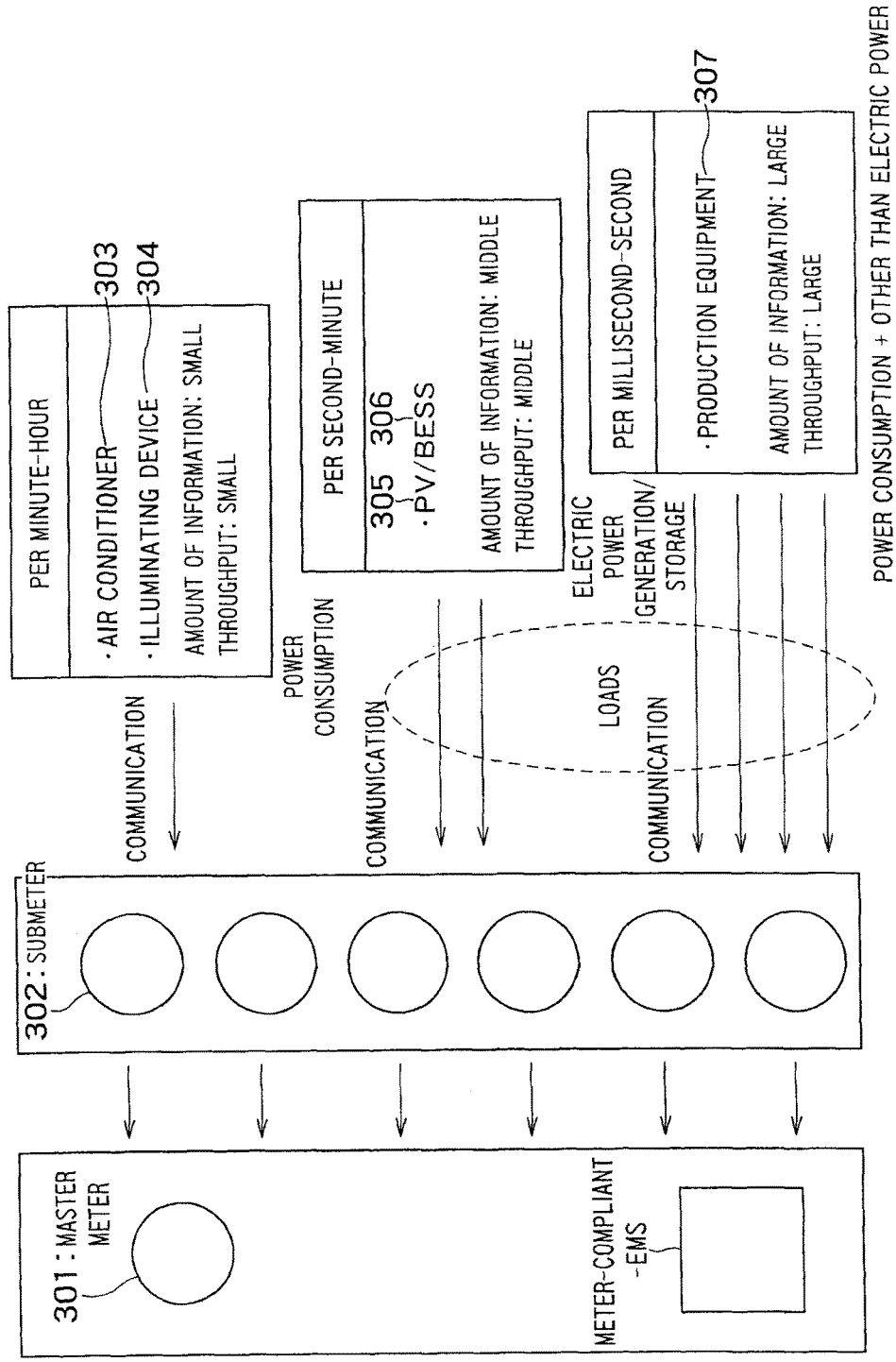
FIG. 15 is a diagram showing a communication procedure of the energy management device in the embodiment of the present invention.

In FIG. 15, a master meter 301, submeters 302, an air conditioner 303, an illuminating device 304, a PV 305, a BESS 306, and a production equipment 307 exist. Here is illustrated, for example, the operation in a case where measurement information on the devices in the facility of the customer is collected on a superordinate system side or a cloud side such as a public service company.

Communication between the devices and the submeters 302 is not limited to the collection of the measurement information, and can be implemented in combination with the notification of control information and the like, as appropriate. In FIG. 4, the devices are classified according to the roles (energies relating to electric power and energies relating to those other than electric power). FIG. 15 shows a state that the devices are further categorized according to the amount of information (the amount of data) or throughput that the devices generate or process. The number of headed arrows between the submeters and the devices expresses the image of the amount of data, and a greater number means a larger amount of data.

For example, the energy management of components relating to the power consumption of such as air conditioners, illuminating devices, or the like mainly handles information on power (W) or electric energy (Wh) being an integrated quantity per certain period of time, and can be considered to have a small amount of information or throughput. For example, a public service company such as an electric power company typically collects measurement information from the smart meters (master meter) of a customer every 30 minutes to 1 hour for the purpose of the demand management for peak cut or peak shaving.

In contrast, the energy management of components relating to the electric power generation or electric power storage of PV, BESS, or the like handles information on, in addition to the power (W) and electric energy (Wh), voltage (V) or frequency (f) for reverse power flow management. These pieces of information are typically in seconds or minutes, and are considered to have a higher amount of information or throughput than the information on power consumption.

Furthermore, the production equipment handles not only the information on power consumption, but also various sensor information (flow rate, temperature, and process) originated from production, and the amounts of information and throughput thereof are in milliseconds in some cases. Therefore, the amount of information and throughput to be communicated are considered to be even higher than the information on electric power generation or electric power storage.

In such a manner, the devices in the facility of a customer can be not only classified according to the roles of energies relating to electric power and energies relating to those other than electric power as shown in FIG. 4, but also further classified according to the amount of information and throughput as shown in FIG. 15.

However, it is assumed in such a case that communicating the information on electric power generation, electric power storage, and production equipment through devices (e.g., master meter and submeter) that handle the information every 30 minutes to 1 hour, would place processing loads on the master meter and the submeters.

Figure 16:
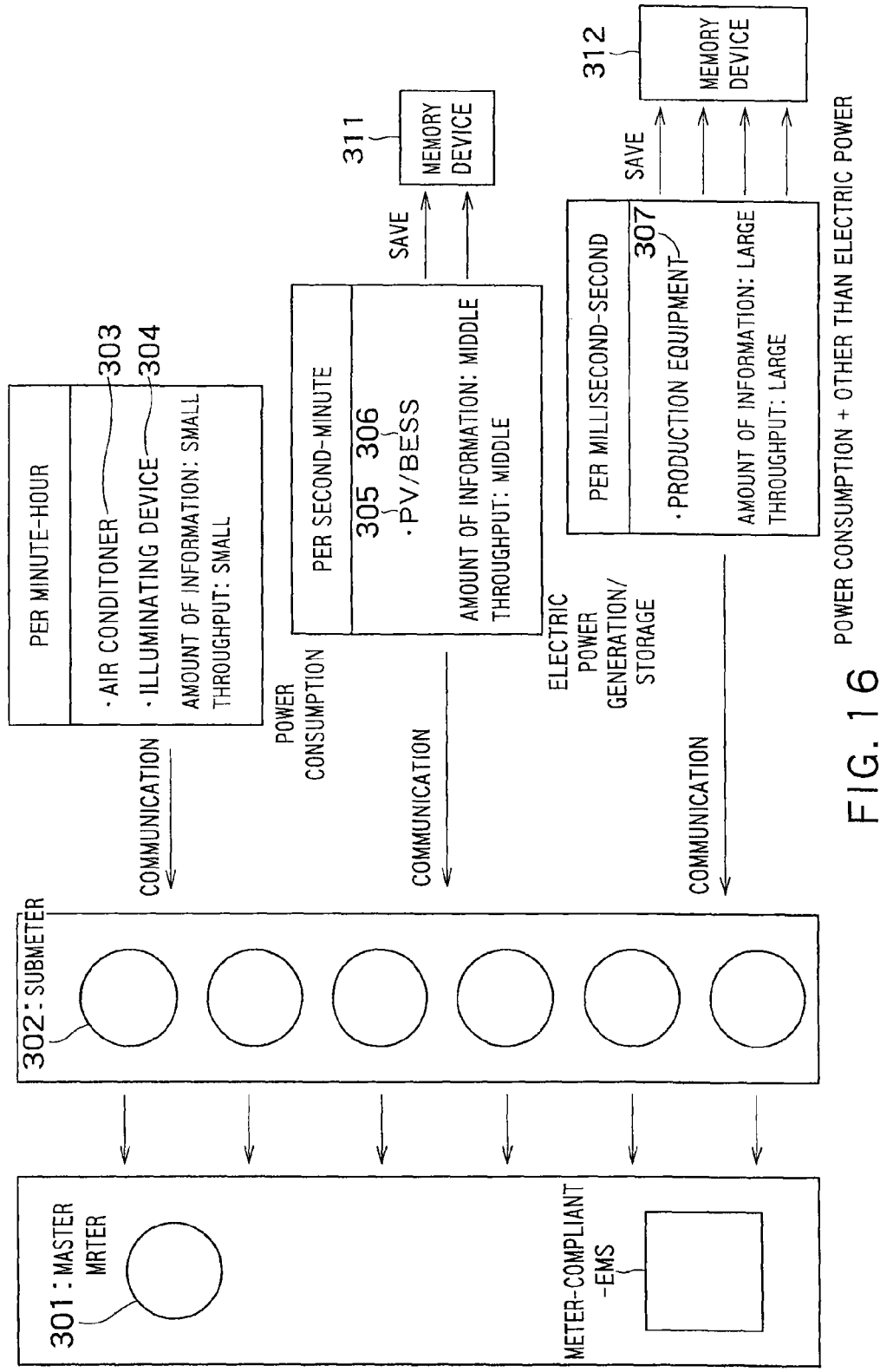
FIG. 16 is a diagram showing a communication procedure of the energy management device in the embodiment of the present invention.
Figure 17:
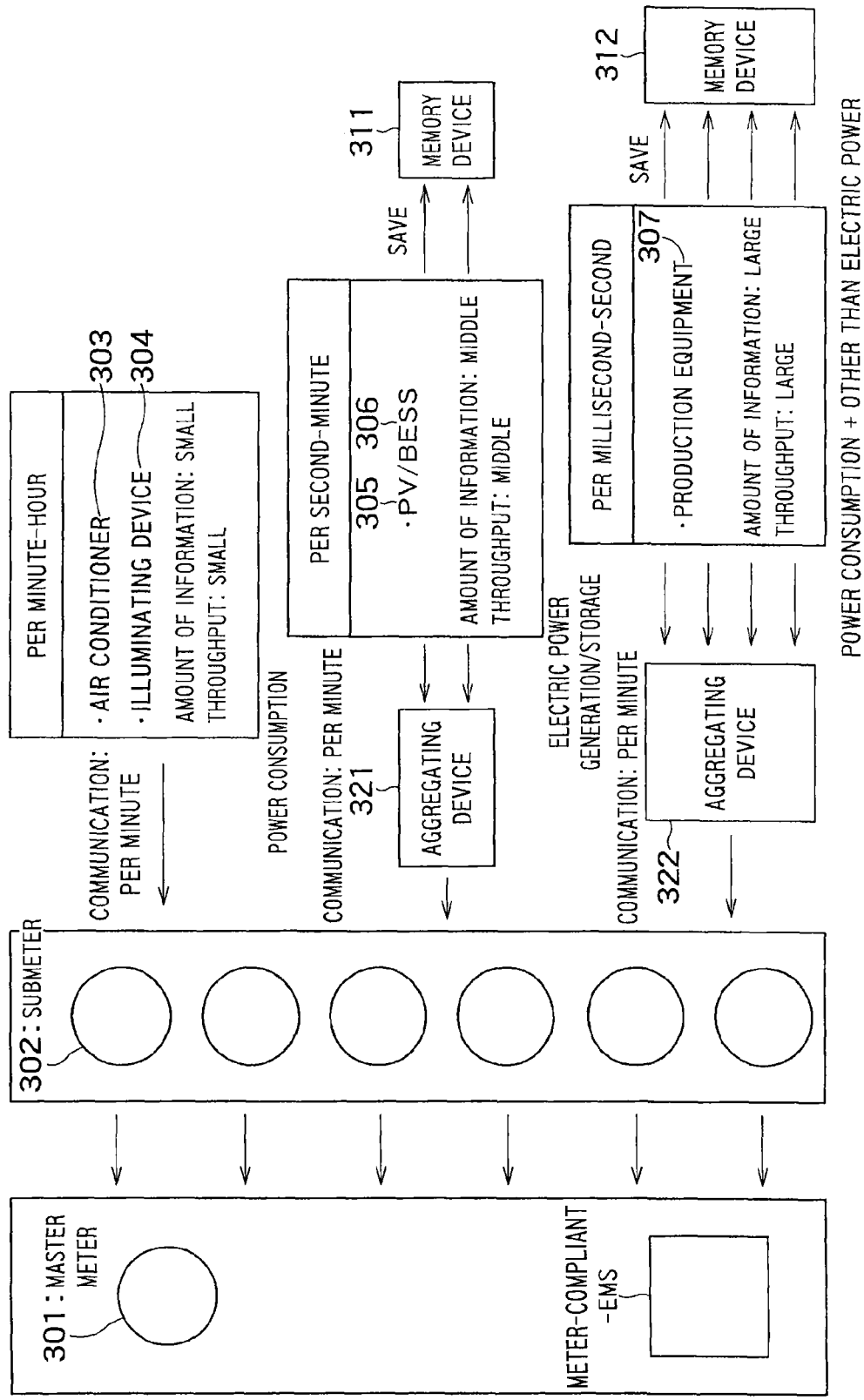
FIG. 17 is a diagram showing a communication procedure of the energy management device in the embodiment of the present invention.

For this reason, it is preferable to reduce the amount of transmission, as shown in FIG. 16, by keeping unprocessed raw information (raw data) as much as possible in memory devices 311 and 312 on the subordinate side in the system, and by transmitting data obtained by processing or compressing the raw information, such as statistics data or data obtained by extracting feature quantities, or data obtained by thinning out the raw information, to the superordinate side. Alternatively, as shown in FIG. 17, it is preferable to dispose aggregating devices 321 and 322 between the submeters and the devices in accordance with the communication load. The aggregating devices transmit data obtained by processing or thinning out the raw information from the devices on the subordinate side.

Adopting the configuration shown in FIG. 16 or FIG. 17 allows for flattening the amount of information and throughput of the master meter, the submeters, and the like even when the components (power electronics devices and measuring devices) are accommodated under devices that handle information, for example, every 30 minutes to 1 hour (e.g., master meter and submeters). It is thereby possible to prevent excessive loads from being placed on the master meter and the submeters in exchanging the information on measurement or control between the public service company and the customer.

Figure 18:
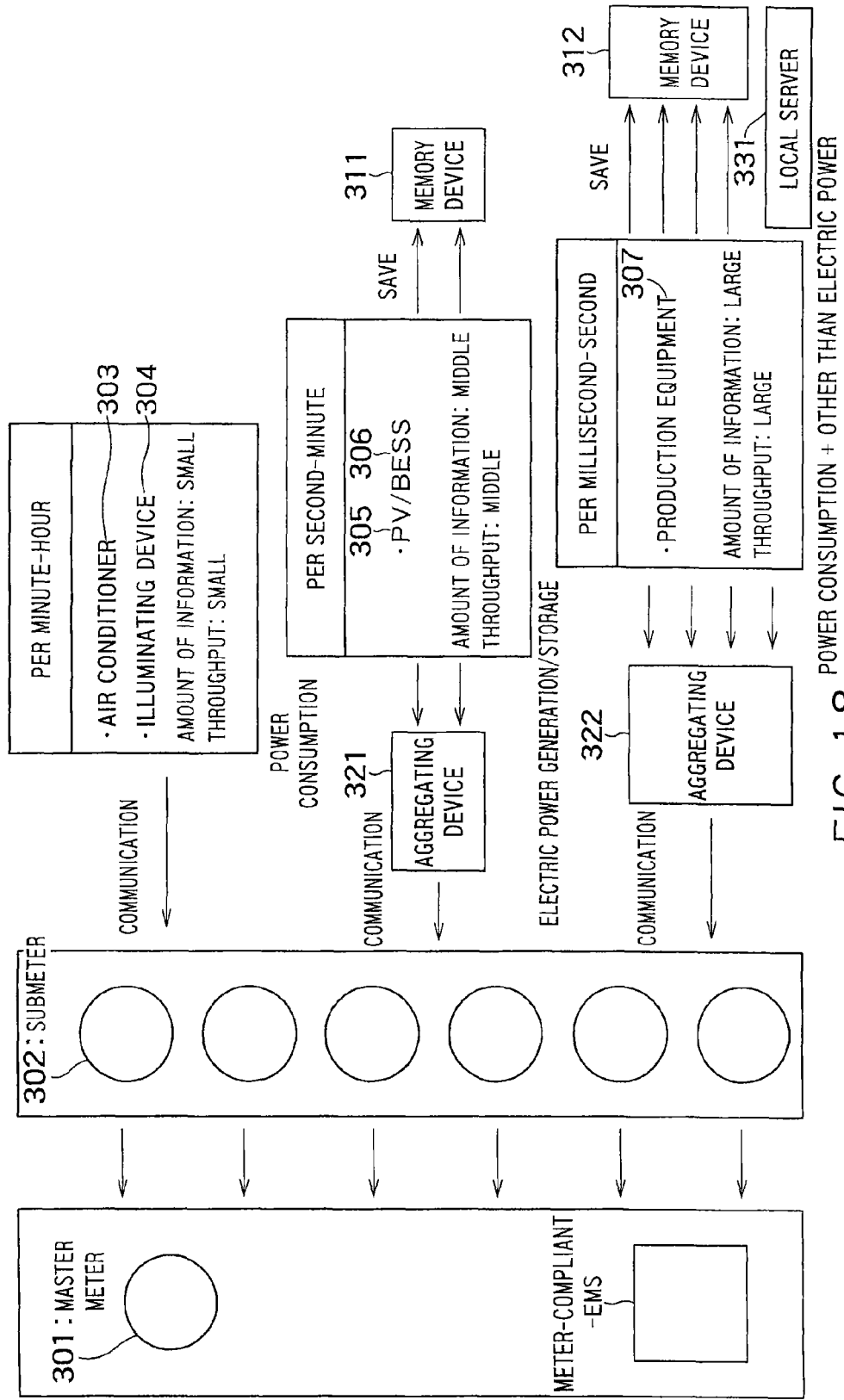
FIG. 18 is a diagram showing a communication procedure of the energy management device in the embodiment of the present invention.

Now, Information that the energy management handles differs according to public service companies such as those of electric power, water, and gas. For example, an electric power company mainly handles information on electric power, a water company mainly handles information on water, and a gas company mainly handles information on gas. It can be considered that each company does not frequently use information other than the information relating to itself. For this reason, a local server may be installed in a customer facility to directly process information that is unnecessary for a public service company as a superordinate. FIG. 18 shows an example of a configuration in which, in the case where a public service company is an electric power company, a local server 331 installed in a customer facility processes information in a production equipment other than the information on electric power. As to the information on electric power, the amount of information and throughput toward the superordinate side is flattened by, as with FIG. 17, disposing the aggregating devices.

Figure 19:
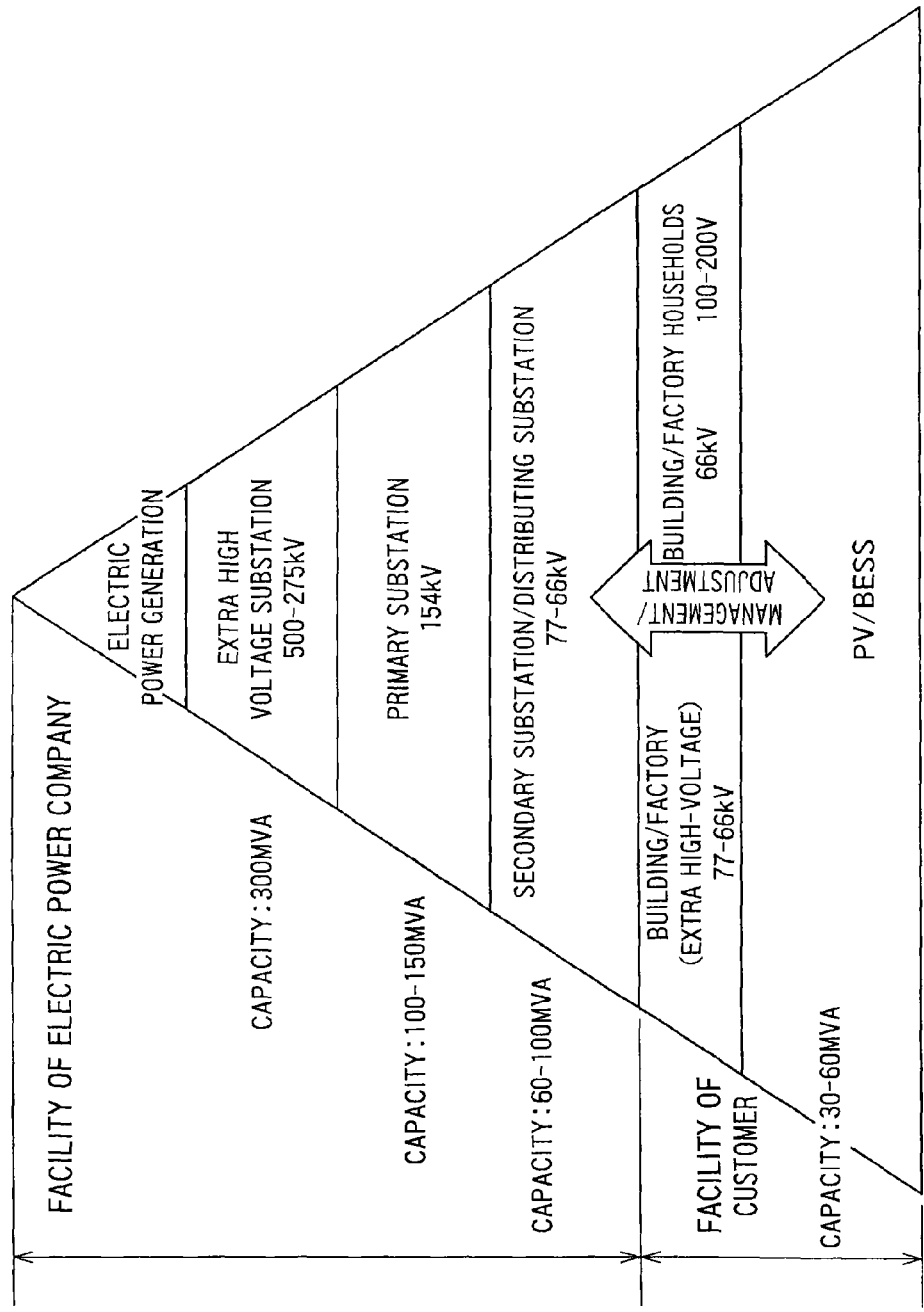
FIG. 19 is a diagram showing the relationship of management, adjustment, investment between a public service company and a customer, according to the embodiment of the present invention.

There will be described an impact of the advent of generation and storage of electric power in a customer, with reference to FIG. 19. FIG. 19 is a diagram that organizes the flow of electric power from a superordinate to a subordinate in the configuration shown in FIG. 1. The facilities of the electric power company delivers electric power generated in power plants (nuclear power, thermal power, and water power) to customers through the electricity infrastructure (electric power system such as a power distribution network).

Substations are facilities to be bases for electric power distribution, which convert (transform) the voltage or frequency of electricity in the electric power system, connect or switch the systems, and control the flow of electric power. Substations handling higher voltages are larger in scale, and facilities relating to power lines are also larger. The electric power company designs such that, due to costs to construct such facilities, the highest voltage is transmitted close to the power plants and the voltage is reduced step-by-step as coming close to the customers (end consumers).

The stages with which the voltages are gradually reduced are called a voltage class, and adjacent classes have a corresponding substation disposed therebetween. For example, an example in a region in Japan includes, as shown in FIG. 19, an extra high voltage substation handling voltages of 500-275 kV and a capacity of 300 MVA, primary substations handling a voltage of 154 kV and capacities of 100-150 MVA, and secondary substations and distributing substations handling voltages of 77-66 kV and capacities of 60-100 MVA. The manner of disposing these substations and the scales of facilities differ according to countries or regions.

In contrast, customers include extra high-voltage customers (buildings and factories) handling voltages of 77-66 kV, high-voltage customers (buildings and factories) handling a voltage of 6.6 kV, and low-voltage customers (households) handling voltages of 100-200 V. In particular, for example, a large scale factory in a extra high-voltage customer has capacities of 30-60 MVA, which may account for about 50% of one distributing substation.

In such a circumstance, it is conceivable that the customer side not only consuming electric power but also having power generation capacity or electricity storage capability by introducing PV or BESS has a great influence, in accordance with a tradeoff between cost and scale, on public service companies, mainly an electric power company, in terms of the energy management. For example, in the example of FIG. 19, if a customer introduces PV or BESS having a scale that can meet an electric power usage of a factory, it is assumed that the system configurations or the operation procedures of demand management (peak cut/peak shaving) or reverse power flow management that the electric power company performs on the customer will change. Specifically, it is conceivable that, in addition to conventional downlink management from the superordinate to the subordinate that the public service company performs on the customer (providing incentives from the public service company based on requests to the customer), uplink management from the subordinate to the superordinate that the customer performs for the public service company (gaining incentives based on proposals from the customer to the public service company) is added.

Figure 20:
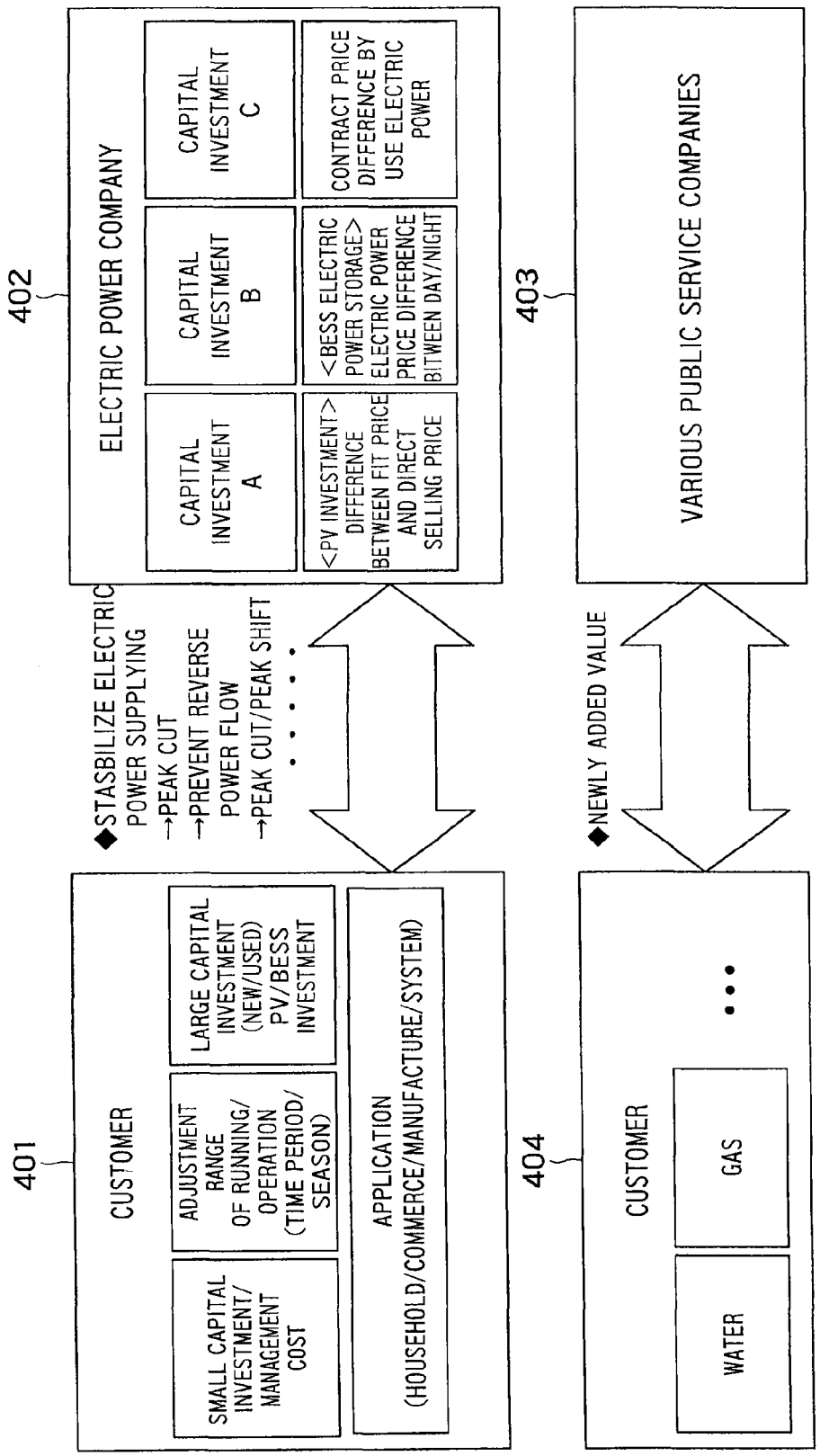
FIG. 20 is a diagram showing the relationship of management, adjustment, investment between a public service company and a customer, according to the embodiment of the present invention.

FIG. 20 is a diagram that organizes the relationship between a public service company and a customer from the viewpoint of capital investment. The upper row of FIG. 20 shows the relationship between the electric power company and the customer, and the lower row shows the relationship between various public service companies of energies other than electric power such as water and gas, and the customer.

As shown in the upper-left side of FIG. 20, in the case of energies relating to electric power, a customer 401 side includes a plurality of application places, such as household, commerce, manufacture, and system, for the energy management device according to the embodiment of the present invention. Important points here are the viewpoints of small-amount capital investment or management cost, adjustment range of running or operation (time period or season), a large-scale capital investment (new or used). For example, in the case where the reverse power flow management is performed to the electric power system at the customer's risk, conceivable investments are not only for the facilities of household, commerce, or manufacture but also for the system. Important viewpoints of power adjustment are operation time and period in operation, and the number of running days and time period in running. The industry has characteristics significantly different from those of the household. In particular, extra high-voltage or high-voltage industry (commerce and manufacture) are large-scale customers, and have a great influence on the management of the public service company, and thus the introduction of demand response may spread in an order from the industry to the households.

On an electric power company 402 side, important points are the viewpoints of charging and incentive with respect to supplying and buying energy, as the public service company. As shown in the upper-right side in FIG. 20, the viewpoint of the difference between a FIT price and a direct selling price is important with respect to PV power generation, and the viewpoints of the difference of electric power prices between daytime and nighttime is important with respect to BESS power storage. In addition, the viewpoint of the difference of contract prices by electric power to be used, such as between electric power from renewable energy generator and electric power from power plants.

As shown in the lower row of FIG. 20, management and charging between a public service company 403 such as water or gas company and a customer 404 has similar viewpoints, and new services according to the lifestyle of the customers may be developed.

In such a relationship between the public service company and the customer in management, adjustment, and investment, the application of the energy management device (master meter and submeters) in the embodiment of the present invention increases the accuracy (estimate) of the control and measurement of energy such as electric power (generation, consumption, and storage), gas, and water, which enables implementing an infrastructure that is margin-less (having a fine adjustment) and does not wastefully dispose of electric power.

Here, conventional energy saving services emphasize compliance with the energy saving law, implementation of energy saving on a factory-by-factory basis (maximization of energy conversion efficiency and minimization of energy loss), and include factory equipment management backup services (facility outsourcing, Energy Service Company (ESCO), facilities management, environment management techniques, diagnosis/management system development), factory equipment optimization engineering (energy improvement contract, energy saving and cost saving support, and compliance with laws), factory equipment operation backup services (facility maintenance, remote monitoring service, and fuel supply). When these energy saving services use a highly intelligent smart meter (master meter and submeter), to which the energy management device according to the embodiment of the present invention is applied, it is possible to newly implement minute energy management between the public service company and the customer, or minute energy management between the customers.

The embodiment of the present invention is to enable seamless energy management for electric power including the consumption, generation, and storage of electric power from a superordinate system to a subordinate system by the master meter and submeters (local controllers), and furthermore, to manage various energies such as electric power, water, and gas for each roles, and to determine how to the flow of energy for each aggregation of devices.

For example, in cogeneration, which handles mixed energies, heat, steam (water), and gas are converted into electricity, and it is determined whether the electricity is consumed, disposed, or accumulated, or whether the operation is stopped. In processes ranging from measurement to monitoring, analysis, countermeasure, and control, a device conventionally determines only how the device itself should do, but the intervention of the energy management device including a submeter (local controller) enables determination while grasping the surroundings. In addition, the embodiment of the present invention can handle not only the amount of energy itself, but also information relating to it, for example, lifetime (failure) information of a PV panel in electric power generation, or capacity information on cells in electric power storage.

Figure 21:
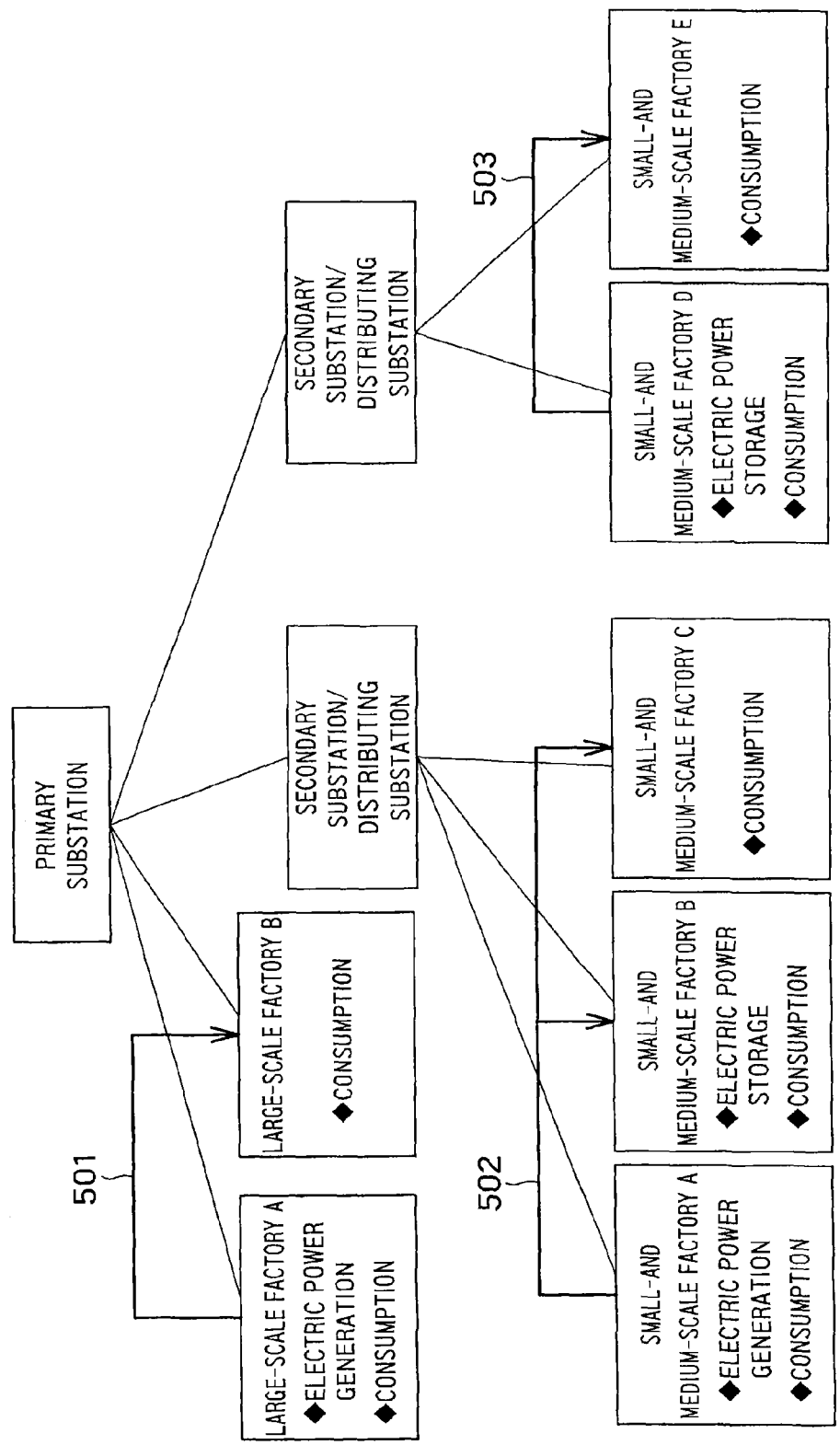
FIG. 21 is a diagram showing an efficient distribution of interchange of energy between a public service company and a customer, according to the embodiment of the present invention.

Enabling these managements, in turn, enables performing modulation on the control or measurement of devices under the master meter and the submeters. It is thereby possible to optimize the conventional individual controls into a total control. The introduction of submeters (local controllers) having specification similar to that of a master meter allows the management to be directed to electric power generation, electric power storage, and the like. In addition, the public service company or the service company can control the generation and storage of electric power. This control can be performed not only on a device-by-device basis, but also for each kind of energy such as generated electric power and accumulated electric power. These controls depend on contract forms of whether direct contract is available or not, or the like. FIG. 21 shows how to optimally distribute the interchange of energy between the public service company and the customer, in the embodiment of the present invention. Shown here is an example of the case of factories. Headed lines 501, 502, and 503 in the drawing show how surplus power such as accumulated electric power and generated electric power is interchanged between the factories. Although the status of operation and running, and the configuration of facility differ according to the factories, the present embodiment enables the mutual interchange of surplus power between the factories, and the reduction of power loss.

In addition, in the cooperation between the electric power system and the PCS/inverter as described above, the application of the submeter (local controller) allows a flexible system to be constructed. For example, in order to stabilize the electric power system, in the case of a system in which the superordinate EMS performs setting and management of a target voltage setting or the like, with the current methods, it is conceivable that sensors directly connected to a PCS/inverter with an analog/digital line, compare difference between a target voltage value and an actual voltage value, and when the values exceeds a predetermined threshold value, notify the state to the PCS/inverter, and the PCS/inverter actually outputs active power or reactive power to control voltage under the threshold value. In contrast, using the submeter (local controller) having a communicating function allows a connection configuration between the PCS/inverter and the submeter to have flexibility (ranging from a fixed one-to-one correspondence of a direct link line type to many-to-many correspondence by performing wireless or wired communication). The submeter (local controller) acquires a target voltage setting, monitors the voltage of the electric power system, and if the difference from an actual value exceeds a predetermined threshold, notifies the state to one or more PCS/inverters with a communication message. The one or more PCS/inverters that receive the change in the state output active power or reactive power to try stabilization control of the voltage, in the form of cooperation among a large number of devices as the case may be. Generally, the output value of energy power from the PCS/inverter has an upper limit due to the rating thereof, and thus by applying a method of sharing the output electric power among a large number of devices, it is possible to implement interchange of energy combining various kinds of electric power through the electric power system and electric power of the PV/BESS from the customer, without concentrating control loads on a particular device.

As described above, with the energy management device according to the embodiment of the present invention, the accuracy (estimated value) of measurement and control of various energies are improved, which enables margin-less (having a fine adjustment) investment, adjustment, and management.

The energy management device as described above may also be realized using a general-purpose computer device as basic hardware. That is, each block of in the energy management device can be realized by causing a processor mounted in the above general-purpose computer device to execute a program. In this case, the energy management device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the energy management device may include a CPU (Central Processing Unit), a ROM (Read Only Memory) and a RAM as one example of circuitry. In this case, each unit or each element in the energy management device can be controlled by a CPU's reading out into a RAM and executing a program which is stored in a storage or ROM.

Also, the above-stated hardware configuration is one example and the energy management device can be realized by an integrated circuit such as a LSI (Large Scale Integration) or an IC (Integrated Circuit) chip set as one example of circuitry. Each function block in the energy management device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An energy management system comprising:
an energy management device disposed in a supply side, an owner of the energy management device being a first owner;
a first energy management device disposed in a customer side, an owner of the first energy management device being the first owner; and
a second energy management device disposed in the customer side, an owner of the second energy management device being a second owner, the first owner being different from the second owner,
wherein the energy management device comprises:
a configuration manager to determine whether to permit communication connection from the energy management device to the second energy management device based on information defining whether or not an energy management server is able to connect to the second energy management device; and,
a measurement manager to collect, via a network, from the second energy management device if communication connection to the second energy management device is permitted, or from the first energy management device if communication connection to the second energy management device is not permitted, energy information based on a physical quantity measured from at least one measurement object belonging to each of a plurality of energy types in the customer side.

2. The energy management system according to claim 1, further comprising:
a control manager to control the second energy management device if connection to the second energy management device is permitted, or control the first energy management device if connection to the second energy management device is not permitted to manage energy of each of the energy types on the customer side.

3. An energy management device disposed in a supply side, a first energy management device and a second energy management device being disposed in a customer side, the energy management device comprising:
a configuration manager to determine whether to permit communication connection from the energy management device to the second energy management device based on information defining whether or not an energy management server is able to connect to the second energy management device, an owner of the energy management device being a first owner, an owner of the first energy management device being the first owner and an owner of the second energy management device being a second owner, the first owner being different from the second owner; and
a measurement manager to collect, via a network, from the second energy management device if communication connection to the second energy management device is permitted, or from the first energy management device if communication connection to the second energy management device is not permitted, energy information based on a physical quantity measured from at least one measurement object belonging to each of a plurality of energy types in the customer side.

4. The energy management device according to claim 3, wherein the first owner is a public service company, and the second owner is a customer, or an owner or a developer of a facility.

5. The energy management device according to claim 3, wherein the plurality of energy types include:
- at least categories of electric power and energies other than electric power, or
- at least categories of electric power consumption, electric power storage, and electric power generation, or
- at least categories of electric power, water, and gas.

6. The energy management device according to claim 3, further comprising:
- a control manager to control the second energy management device if connection to the second energy management device is permitted, or control the first energy management device if connection to the second energy management device is not permitted to manage energy of each of the energy types on the customer side.

7. An energy management method performed by an energy management device disposed in a supply side, a first energy management device and a second energy management device being disposed in a customer side, the energy management method comprising:
- determining whether to permit communication connection from the energy management device to the second energy management device based on information defining whether or not an energy management server is able to connect to the second energy management device, an owner of the energy management device being a first owner, an owner of the first energy management device being the first owner, an owner of the second energy management device being a second owner, the first owner being different from the second owner; and
- collecting, via a network, from the second energy management device if communication connection to the second energy management device is permitted, or from the first energy management device if communication connection to the second energy management device is not permitted, energy information based on a physical quantity measured from at least one measurement object belonging to each of a plurality of energy types in the customer side.

8. The energy management method according to claim 7, further comprising:
- controlling the second energy management device if connection to the second energy management device is permitted, or controlling the first energy management device if connection to the second energy management device is not permitted to manage energy of each of the energy types on the customer side.

9. A non-transitory computer readable medium having a computer program stored therein which causes a computer arranged in an energy management device disposed in a supply side to perform processes, a first energy management device and a second energy management device being disposed in a customer side, the processes comprising:
- determining whether to permit communication connection from the energy management device to the second energy management device based on information defining whether or not an energy management server is able to connect to the second energy management device, an owner of the energy management device being a first owner, an owner of the first energy management device being the first owner, an owner of the second energy management device being a second owner, the first owner being different from the second owner; and
- collecting, via a network, from the second energy management device if communication connection to the second energy management device is permitted, or from the first energy management device if communication connection to the second energy management device is not permitted, energy information based on a physical quantity measured from at least one measurement object belonging to each of a plurality of energy types in the customer side.

10. The medium according to claim 9, further causing the computer to perform processes comprising:
- controlling the second energy management device if connection to the second energy management device is permitted, or controlling the first energy management device if connection to the second energy management device is not permitted to manage energy of each of the energy types on the customer side.

* * * * *